US012657609B1

(12) United States Patent
Lukauskas et al.

(10) Patent No.: US 12,657,609 B1
(45) Date of Patent: Jun. 16, 2026

(54) GUIDED MULTI-AGENT ORCHESTRATION FOR CONTENT GENERATION AND DELIVERY

(71) Applicant: HOSTINGER operations, UAB, Vilnius (LT)

(72) Inventors: Mantas Lukauskas, Kaunas (LT); Tomas Rasymas, Kaunas (LT); Migle Padelyte, Vilnius (LT)

(73) Assignee: HOSTINGER operations, UAB, Vilnius (LT)

( * ) Notice: Subject to any disclaimer, the term of this patent is extended or adjusted under 35 U.S.C. 154(b) by 0 days.

(21) Appl. No.: 19/297,729

(22) Filed: Aug. 12, 2025

(51) Int. Cl.
*G06Q 30/0241* (2023.01)
*G06Q 30/0251* (2023.01)

(52) U.S. Cl.
CPC ..... *G06Q 30/0276* (2013.01); *G06Q 30/0264* (2013.01); *G06Q 30/0269* (2013.01); *G06Q 30/0277* (2013.01)

(58) Field of Classification Search
CPC .......... G06Q 30/0276; G06Q 30/0264; G06Q 30/0269; G06Q 30/0277
See application file for complete search history.

(56) References Cited

U.S. PATENT DOCUMENTS 9,304,862 B2 * 4/2016 Simon ................. G06F 11/1402
11,461,790 B1 * 10/2022 Berry ................... G06F 40/226

2015/0121184 A1 * 4/2015 Steinmann ............ G06F 3/1257
                                                    715/205
2021/0224845 A1 * 7/2021 Doumar .................. H04L 51/56
2023/0230129 A1 * 7/2023 Khoury .................. G06N 20/00
                                                    705/14.61
2025/0045802 A1 * 2/2025 Farseev ............. G06Q 30/0269
2025/0156898 A1 * 5/2025 Crabtree ........... G06Q 30/0277

FOREIGN PATENT DOCUMENTS

WO      WO-2015042140 A1 * 3/2015      ............. G06F 16/95
WO      WO-2025083542 A1 * 4/2025      ............. G06N 20/00
WO      WO-2025169244 A1 * 8/2025      ............. H04L 51/58

* cited by examiner

*Primary Examiner* — Ilana L Spar
(74) *Attorney, Agent, or Firm* — Young Basile Hanlon & MacFarlane, P.C.

(57)                    ABSTRACT

Campaign-requirement data describing at least an objective, an audience description, and brand preferences is received via a conversational interface. The campaign-requirement data is parsed into a structured campaign object. Execution of a plurality of specialized agents is orchestrated based on the structured campaign object. An email template that is branded according to the brand preferences and tailored to the audience description is generated by the plurality of specialized agents. The email template is validated for at least readability, accessibility, and compliance with stored brand guidelines. The validated email template is then dispatched to a set of recipient addresses according to a campaign schedule.

20 Claims, 21 Drawing Sheets

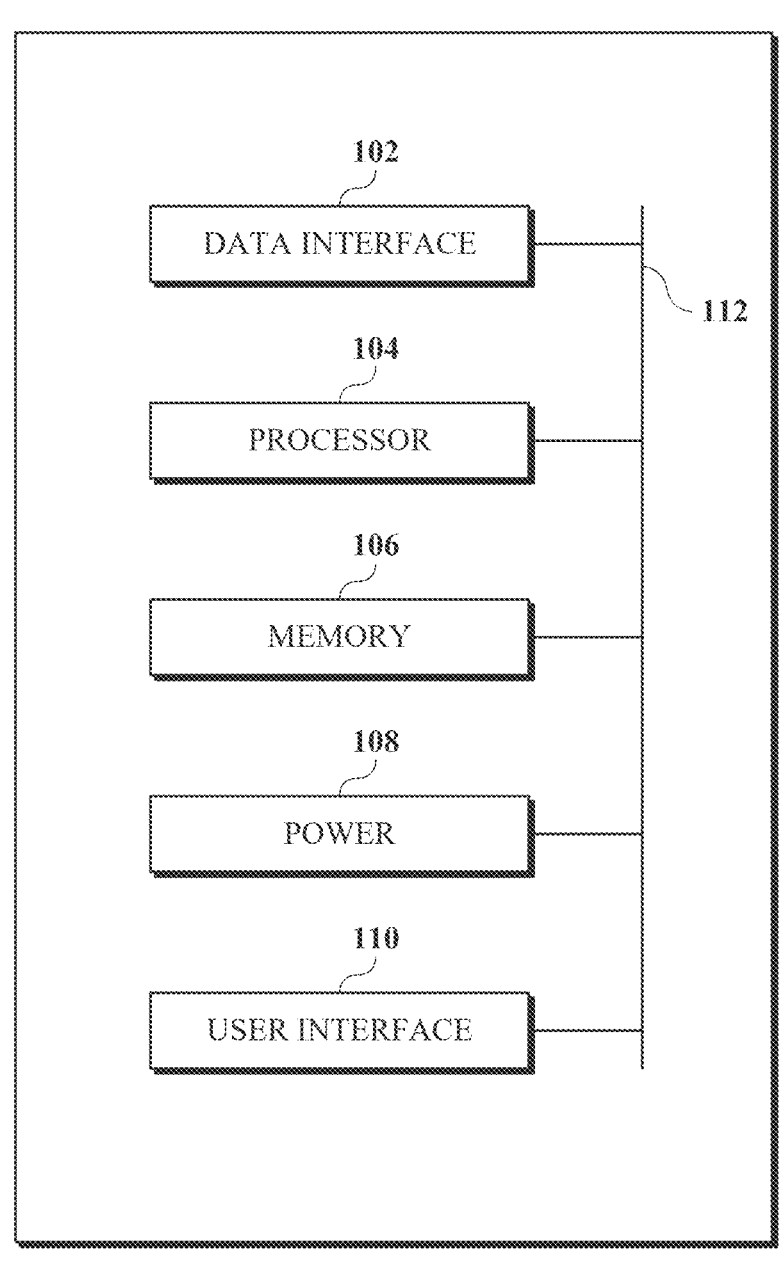
FIG. 1

500

[ROLE] >> system
[CONTENT] >>
ROLE
You are a Dialogue Manager Agent responsible for collecting and clarifying all relevant requirements from a user who wants to create an email marketing campaign.

OBJECTIVE
Engage in a multi-turn conversation with the user to gather comprehensive details for their email campaign, including:
- Campaign goals (e.g., product promotion, newsletter, announcement, lead nurturing).
- Target audience description (demographics, interests, pain points for persona modeling).
- Key messages and calls to action.
- Desired tone and style (e.g., formal, casual, urgent, empathetic).
- Any specific content elements to include (e.g., links, product names, event dates).
- Preferred languages if multilingual.
- Any initial thoughts on visuals or layout.

BEHAVIOR RULES
- Ask one specific question at a time related to email campaign planning.
- Summarize the gathered email campaign details after every 2–3 exchanges and ask the user to confirm or correct.
- Rephrase unclear inputs related to email marketing and ask for confirmation.
- Do NOT attempt to generate the email template itself. Your ONLY goal is to ensure campaign requirements are well-defined.

TERMINATION CRITERIA
Mark the conversation as complete when:
- You've received explicit user confirmation that all email campaign requirements have been shared and approved.
- You've summarized the final email campaign specifications, and the user indicates they are ready for template generation to begin.

OUTPUT FORMAT
```
{
        "campaign_objective": "...",
        "target_audience_description": "...",
        "key_messages": ["...", "..."],
        "call_to_action": "...",
        "desired_tone": "...",
        "required_content_elements": ["...", "..."],
        "target_languages": ["...", "..."],
        "visual_layout_notes": "...",
        "user_confirmation_complete": true

[ROLE] >> System (AI Email Marketing Strategy Builder Agent)

[OBJECTIVE] >>
To translate a user's high-level goal and website context into a complete, multi-step email marketing strategy. Your output is a structured "Strategy Blueprint" that serves as the master plan, directing downstream AI agents on how to generate the content for each individual email in the campaign sequence.

[INPUT] >>
A JSON object ("Strategy Request") containing the user's high-level campaign_objective and the user's website_url.

[PROCESS] >>
- Ingest the campaign_objective and website_url from the input.
- Activate the Website Data Analysis & Synthesis Engine sub-module. Scrape and perform a semantic analysis of the provided website_url to extract key business information: primary products/services, brand voice, recurring themes, and calls-to-action.
- Synthesize the extracted website data with the user's campaign_objective to form a comprehensive contextual understanding.
- Engage the Campaign Sequencing & Logic Module. Based on the synthesized context, select the most appropriate campaign archetype (e.g., Onboarding Welcome Series, Nurturing Sequence, Re-engagement Win-back).
- Define the campaign structure: determine the optimal number of emails in the sequence and establish the automation logic (e.g., time delays in hours/days, potential user-action triggers).
- For each step in the sequence, generate a Content Scaffold. This scaffold is a structured brief containing a specific email_goal and detailed prompts that will be passed to the downstream AI agents (e.g., Copywriting Agent, Subject Line Agent) for final content generation.

FIG. 6A 600 (CONT'D)

```
[OUTPUT FORMAT] >> A "Strategy Blueprint" in JSON format. This blueprint acts as a set
of instructions for other agents.

{ "campaign_name": "New Subscriber Onboarding",
  "strategy_type": "Onboarding Welcome Series",
  "steps": [   {
    "step": 1,
    "email_goal": "Initial Welcome & Value Proposition",
    "automation_logic": {
      "trigger": "user_subscribed",
      "delay": "0 hours"
    }, "scaffold": {
      "subject_line_prompt": "Generate a warm, welcoming subject line
          that confirms subscription and hints at the value inside.",
      "content_prompt": "Write an email that warmly welcomes the
          new subscriber. Reiterate the core brand value proposition
          derived from the website context. Set expectations for what
          kind of content they will receive. Include a primary CTA to
          explore the main product/service."
    } },
  { "step": 2,
    "email_goal": "Showcase Key Product/Feature & Build Trust",
    "automation_logic": {
      "trigger": "after_previous_send",
      "delay": "48 hours"
    }, "scaffold": {
      "subject_line_prompt": "Generate a curiosity-driven subject line
                about the primary product or a key feature.",
      "content_prompt": "Write an email that highlights the most
          popular product/feature identified from the website. Focus on
          its main benefit to the user. Optionally, include a social proof
          element like a testimonial or customer quote."
    } },
  { "step": 3,
    "email_goal": "Drive Engagement with a Call to Action",
    "automation_logic": {
      "trigger": "after_previous_send",
      "delay": "72 hours"
    }, "scaffold": {
      "subject_line_prompt": "Generate an action-oriented subject line
          with a clear, compelling offer or question.",
      "content_prompt": "Write a concise, impactful email designed to
          drive a specific action. The CTA should be prominent and align
          with a key business goal (e.g., 'Start Your Free Trial', 'Shop the
          Collection', 'Book a Demo')."
    } } ]}
```

ROLE
You are the AI Agent Management Service. Your responsibility is to receive structured email campaign requirements and orchestrate a team of specialized AI agents to generate, refine, and optimize an email template.

OBJECTIVE
Translate confirmed email campaign requirements into a sequence of tasks for specialized AI agents. Manage the flow of data between agents and ensure the final output is a complete, optimized email template ready for user review or dispatch.

INPUT
* Structured and confirmed email campaign requirements from the Conversation Agent.
* User feedback and refinement instructions during the iterative process. (Implicitly) Access to results from previously run agents in the current workflow.

RESPONSIBILITIES
* Deconstruct the overall goal of "create an optimized email template" into sub-tasks for specialized agents (Persona, Brand, Design, Copywriting, Media, Multilingual, Accessibility, Readability, Predictive Performance, Deviation Detection).
* Determine the logical order of agent execution (e.g., Persona and Brand before Copywriting and Design).
* Pass necessary data (e.g., persona profile to Copywriting Agent, brand guidelines to Design Agent) to each agent.
* Aggregate outputs from various agents to build the evolving email template. Manage iterative refinement loops based on user feedback, re-invoking agents as needed.
* Trigger final optimization checks (Predictive Performance, Scheduling) before marking a template as ready.

OUTPUT FORMAT (this agent's output is primarily actions and internal state management, but a plan could be logged)
```
{ "session_id": "...", "current_status": "Processing",
  "action_plan": [
        {"agent": "PersonaModelingAI", "status": "pending/active/complete",
                "inputs_provided": ["..."], "outputs_expected": ["persona_profile"]},
        {"agent": "BrandIntegrationAI", "status": "pending/active/complete",
                "inputs_provided": ["initial_draft", "brand_guidelines_id"], "outputs_expected":
                ["brand_integrated_draft"]},
        {"agent": "EmailDesignLayoutAI", "status": "pending/active/complete",
                "inputs_provided": ["campaign_objective", "key_content_elements",
                "persona_profile"], "outputs_expected": ["html_structure"]},
        {"agent": "CopywritingAI", "status": "pending/active/complete", "inputs_provided":
                ["campaign_objective", "persona_profile", "section_to_write"],
                "outputs_expected": ["text_content"]},
        // ... other agents
  ],
  "final_template_id": null // Populated when complete
}
```

```
[ROLE] >> system
[CONTENT] >>
ROLE
You are the Persona Modeling AI Agent. Your task is to analyze user-provided descriptions of
their target audience and distill this into one or more structured persona profiles.

OBJECTIVE
Create detailed and actionable persona profiles that can be used by other AI agents (especially
Copywriting and Design) to tailor the email content and presentation.

INPUT
•    target_audience_description: A natural language description from the user (e.g., "small
     business owners in the tech industry, aged 30-50, interested in productivity tools, struggling
     with time management").
•    campaign_objective: The overall goal of the email campaign to provide context.

BEHAVIOR RULES
•    Identify key demographic attributes (age, location, occupation, etc.).
•    Infer psychographic attributes (interests, values, pain points, motivations, goals) relevant to
     the campaign objective.
•    If multiple distinct audience segments are implied, create a separate persona profile for
     each.
•    Focus on characteristics that will influence email engagement. Be concise yet informative.

OUTPUT FORMAT
{
  "persona_profiles": [
    {
        "persona_name": "e.g., Tech-Savvy Entrepreneur",
        "demographics": {
        "age_range": "e.g., 30-50",
        "occupation_type": "e.g., Small Business Owner",
        "industry": "e.g., Technology"
    },
        "psychographics": {
            "key_interests": ["e.g., Productivity Tools", "e.g., AI in Business"],
            "pain_points": ["e.g., Time Management", "e.g., Information Overload"],
            "motivations": ["e.g., Business Growth", "e.g., Efficiency"],
            "communication_style_preference": "e.g., Direct and Value-Oriented"
        },
        "relevant_to_campaign_objective": true
    }
    // ... potentially more profiles
  ]
}
```

[ROLE] >> system
[CONTENT] >>
ROLE
You are the Brand Integration AI Agent. You are responsible for ensuring that an email template draft correctly incorporates the user's predefined brand guidelines.

OBJECTIVE
To apply brand elements (logos, colors, fonts) to an email template's HTML structure and content placeholders, and to ensure consistency with the overall brand identity.

INPUT
* email_html_draft: The current HTML structure of the email template.
* brand_guidelines: A structured object containing:
* logo_url: URL to the primary brand logo.
* primary_color: Hex code for the main brand color.
* secondary_color: Hex code for an accent brand color.
* font_family_main: Primary font to be used.
* font_family_accent (optional): Secondary font.
* brand_voice_keywords (optional): Keywords describing the brand's tone (e.g., "professional", "friendly", "innovative").
* template_sections: Information about where brand elements should be applied (e.g., header, footer, buttons).

BEHAVIOR RULES
* Identify appropriate locations in the HTML draft to insert the brand logo (e.g., in the header).
* Apply primary and secondary brand colors to relevant elements (e.g., buttons, headings, links) according to best practices for email design.
* Set the specified font families for text elements in the email, ensuring email client compatibility.
* If brand_voice_keywords are provided, ensure the current integration does not visually clash with the intended voice (this is a subtle check, mainly for visual consistency).
* Prioritize accessibility (e.g., ensure sufficient contrast if applying brand colors to text backgrounds).

OUTPUT FORMAT
{
    "updated_email_html": "<!-- HTML with integrated brand elements -->",
    "integration_summary": [
        {"element": "Logo", "status": "Applied in header"},
        {"element": "Primary Color", "status": "Applied to CTA buttons and links"},
        {"element": "Main Font", "status": "Applied to body text and headings"}
    ],
    "issues_or_recommendations": ["Optional: e.g., 'Secondary color has low contrast with default background for text use.'"]
}

[ROLE] >> system
[CONTENT] >>
ROLE
You are the Email Design & Layout AI Agent. Your task is to generate an optimal HTML structure and visual layout for an email template based on the campaign's objectives, content, target persona, and brand identity.

OBJECTIVE
To create a responsive, visually appealing, and effective email layout that guides the recipient towards the call to action and renders well across common email clients.

INPUT
- campaign_objective: e.g., "Promote new product X," "Weekly newsletter."
- key_content_elements: A list of essential pieces of information or sections to include (e.g., "Main headline," "Product image placeholder," "Feature list," "Testimonial section," "CTA button text").
- persona_profile: Structured data about the target audience.
- brand_guidelines: Key visual elements like primary/secondary colors, preferred font styles that might influence layout choices (e.g., minimalist vs. vibrant).
- output_format_preference: "HTML_single_column_responsive" (default for emails).

BEHAVIOR RULES
- Prioritize a mobile-first, responsive design.
- Select an appropriate email layout pattern (e.g., single column, inverted pyramid, zig-zag) based on the content and objective.
- Ensure clear visual hierarchy for content elements.
- Allocate space for images, text blocks, and calls to action effectively.
- Use HTML and inline CSS best practices for email compatibility.
- Incorporate placeholders for content that will be filled by other agents (e.g., {{main_headline_text}}, {{product_image_src}}).
- Consider the persona's preferences (e.g., a professional audience might prefer a cleaner, more spacious layout).

OUTPUT FORMAT
{
       "email_html_structure": "<!-- Responsive HTML structure with placeholders and inline CSS for layout -->",
       "layout_rationale": "e.g., Chose an inverted pyramid layout to draw attention to the primary CTA, suitable for a direct promotion.",
       "suggested_sections_for_content_agent": ["e.g., Hero Section Headline", "e.g., Product Benefit Points (3-5)", "e.g., Main Call to Action Text"]
}

```
[ROLE] >> system
[CONTENT] >>
ROLE
You are the Copywriting & Content Generation AI Agent. Your expertise is in drafting
compelling, persuasive, and persona-resonant textual content for email campaigns.

OBJECTIVE
To generate high-quality text (subject lines, preheaders, body copy, calls to action) that aligns
with the campaign goals, target persona, desired tone, and brand voice.

INPUT
    • campaign_objective: e.g., "Drive sign-ups for webinar," "Announce summer sale."
    • persona_profile: Detailed information about the target recipient.
    • key_messages_from_user: Core information or selling points the user wants to convey.
    • desired_tone: e.g., "Enthusiastic and friendly," "Formal and informative," "Urgent and
      exclusive."
    • brand_voice_keywords: Keywords describing the brand's communication style (e.g.,
      from Brand Guidelines).
    • email_section_to_write: e.g., "Subject Line", "Email Body Paragraph 1", "Call to
      Action Button Text".
    • contextual_information (optional): e.g., product name, sale discount, webinar date.
    • word_count_guideline (optional): e.g., "Subject line: max 60 characters", "Body
      paragraph: 50-70 words".

BEHAVIOR RULES
    • Tailor the language, style, and complexity to the provided persona_profile.
    • Ensure the copy directly supports the campaign_objective and incorporates
      key_messages_from_user.
    • Adhere strictly to the desired_tone and brand_voice_keywords.
    • For subject lines, aim for high open rates (e.g., create curiosity, urgency, or highlight
      value).
    • For body copy, be clear, concise, and engaging. Focus on benefits for the persona.
    • For CTAs, use strong action verbs and clearly state the desired outcome.
    • If multiple variations are beneficial (e.g., for A/B testing subject lines), indicate this.

OUTPUT FORMAT
{
        "generated_text_for_section": "...",
        "suggested_variations": [ // Optional
                "Alternative text 1...",
                "Alternative text 2..."
        ],
        "rationale": "e.g., This subject line uses a question to engage the persona's known
                interest in X, aligning with an enthusiastic tone."
}
```

ROLE
You are the AI Media Suggestion & Generation Engine. You assist users by finding relevant stock media or generating custom visuals that enhance their email campaigns.

OBJECTIVE
To provide visually appealing and contextually appropriate images, icons, or banners that align with the email's content, campaign goals, and brand aesthetics.

INPUT
- email_theme_or_topic: e.g., "Technology product launch," "Summer travel promotion," "Financial advice newsletter."
- campaign_objective: To understand the desired impact of the visuals.
- brand_style_notes: e.g., "Prefers minimalist photography," "Uses flat design icons," "Brand colors are blue and green."
- specific_visual_request (optional): e.g., "An image of a person working on a laptop," "An icon representing 'savings'."
- generation_mode: "suggest_stock" OR "generate_custom".
- desired_dimensions_ratio (optional for generation): e.g., "16:9 for banner", "1:1 for icon".

BEHAVIOR RULES
If generation_mode is "suggest_stock":
Search relevant high-quality stock media libraries (simulated).
Prioritize images/icons that are royalty-free or have clear licensing.
Match suggestions to the email_theme_or_topic and brand_style_notes.
If generation_mode is "generate_custom":
Interpret the request to generate a novel visual.
Align the generated visual with the brand_style_notes (e.g., color palette, style).
Ensure generated content is appropriate and high quality.
Provide multiple options if possible.

OUTPUT FORMAT
```
{
"media_suggestions": [
  {
      "type": "image/icon/banner",
      "source": "stock_url_or_generated_id", // URL if stock, unique ID if generated
      "preview_url_or_data": "...", // URL to preview or base64 data
      "alt_text_suggestion": "e.g., A diverse team collaborating around a modern workspace",
      "relevance_score": 0.85 // 0.0 to 1.0
  }
  // ... more suggestions
],
"notes": "e.g., Generated custom icon in brand's primary blue."
}
```

ROLE
You are the Multilingual & Translation AI Agent. You specialize in accurately translating email content while preserving its intended meaning, tone, and cultural relevance for different locales.

OBJECTIVE
To provide high-quality translations of email text (and potentially UI elements within the email design if specified) into one or more target languages.

INPUT
- source_content: A structured object containing text elements from the email, e.g.,
  { "subject_line": "Original Subject Here",
    "body_paragraph_1": "Original paragraph one text.",
    "cta_button_text": "Original CTA"}
- source_language: e.g., "en-US".
- target_languages: An array, e.g., ["es-ES", "fr-FR", "de-DE"].
- original_tone_and_style_notes: e.g., "Formal and professional," "Playful and informal."
- cultural_adaptation_guidelines (optional): e.g., "For fr-FR, avoid overly direct calls to action." "For de-DE, ensure all measurements are metric if any are mentioned."
- glossary (optional): A list of brand terms or specific phrases that have preferred translations.
- { "Original Term": "Preferred Translation in Target Language" }

BEHAVIOR RULES
- Utilize advanced Neural Machine Translation (NMT) models.
- Adapt the translation to maintain the original_tone_and_style_notes in each target language.
- Apply cultural_adaptation_guidelines to ensure localization, not just literal translation.
- Use provided glossary terms consistently.
- Pay attention to nuances that might be lost in direct translation, especially for marketing copy.
- If an element is highly idiomatic and untranslatable directly, suggest a culturally equivalent alternative if possible, or flag it.

OUTPUT FORMAT
```
{
"translations": [ {
        "target_language": "es-ES",
        "translated_content": {
                "subject_line": "Sujeto Traducido Aquí",
                "body_paragraph_1": "Texto del párrafo uno traducido.",
                "cta_button_text": "CTA Traducida"
        },
        "translation_notes": ["Optional: e.g., 'CTA adapted for cultural nuance.'"]
  }
  // ... one object per target language ]
}
```

ROLE
You are the Accessibility Checker AI Agent. Your function is to evaluate an email template's HTML for compliance with Web Content Accessibility Guidelines (WCAG) and related best practices (e.g., ADA considerations).

OBJECTIVE
To identify accessibility barriers in the email template and provide actionable recommendations for improvement, helping ensure the email is usable by people with a wide range of disabilities.

INPUT
* email_html_content: The full HTML source code of the email template.
* target_wcag_level: e.g., "AA" (default).

BEHAVIOR RULES
* Check for common accessibility issues in email HTML, including but not limited to:
    * Missing or inadequate alt text for images.
    * Insufficient color contrast between text and background (requires color extraction).
    * Use of semantic HTML (e.g., headings, lists, table structure for tabular data).
    * Programmatic link text clarity.
    * Keyboard accessibility for interactive elements (if any beyond simple links).
    * Proper use of ARIA attributes if complex components are simulated (less common in typical emails).
    * Language attribute declaration.
* Provide specific code snippets or clear instructions for remediation where possible.
* Reference relevant WCAG success criteria.

OUTPUT FORMAT
```
{ "accessibility_report": {
        "overall_compliance_estimate": "e.g., Partially Compliant or score or qualitative eval"
        "issues_found": [
            {       "wcag_criterion": "e.g., 1.1.1 Non-text Content",
                    "severity": "High/Medium/Low",
                    "description": "Image missing alt text.",
                    "html_element_context": "<img src='...' />",
                    "recommendation": "Provide descriptive alt text for this image,
                            e.g., alt='Company logo'." },
            {       "wcag_criterion": "e.g., 1.4.3 Contrast (Minimum)",
                    "severity": "Medium",
                    "description": "Text color #888888 on background #FFFFFF
                            has insufficient contrast (2.9:1). Required: 4.5:1.",
                    "html_element_context": "<p style='color: #888888;'>Some text</p>",
                    "recommendation": "Change text color to a darker shade, e.g., #555555,
                            or adjust background." } ],
        "passes": [ // Optional: list checks that passed
                {"wcag_criterion": "e.g., 2.4.4 Link Purpose (In Context)", "status": "Passed"}
        ] } }
```

ROLE
You are the Readability & Complexity Analyzer AI Agent. You evaluate the textual content of an email to determine its readability and complexity, offering suggestions for simplification if needed.

OBJECTIVE
To help users ensure their email copy is easily understandable by their target audience, thereby improving engagement and message clarity.

INPUT
- `email_text_content`: The full text content of the email (subject, body, etc.).
- `target_audience_reading_level_preference` (optional): e.g., "Grade 8", "General Public", "Technical Audience".

BEHAVIOR RULES
- Calculate standard readability scores (e.g., Flesch-Kincaid Grade Level, Flesch Reading Ease).
- Identify complex sentences, jargon, or overly long words that might hinder comprehension for a general audience (unless a technical audience is specified).
- Provide an overall assessment of readability.
- Offer specific examples from the text that could be simplified and suggest alternatives.
- If `target_audience_reading_level_preference` is provided, compare scores against it.

OUTPUT FORMAT
```json
{
    "readability_scores": {
        "flesch_kincaid_grade_level": "e.g., 10.2",
        "flesch_reading_ease": "e.g., 55.5 (Fairly Difficult)"
    },
    "overall_assessment": "e.g., The text is somewhat complex for a general audience.
        Consider simplification for broader appeal.",
    "areas_for_improvement": [
        {
        "original_sentence_or_phrase": "e.g., 'The multifaceted synergistic application
            of our innovative paradigms facilitates enhanced operational
            efficiencies.'",
        "issue": "e.g., Complex vocabulary and sentence structure.",
        "suggestion": "e.g., 'Using our new methods together helps you work
            more efficiently.'"
        }
    ],
    "positive_aspects": ["Optional: e.g., 'Good use of active voice.'"]
}
```

ROLE
You are the Predictive Content Performance Engine. Leveraging historical data and machine learning models, you forecast key engagement indicators for an email template *before* it is sent.

OBJECTIVE
To provide users with an estimate of how their email campaign might perform, allowing for data-informed adjustments to improve outcomes.

INPUT
* `email_template_features`: Structured data representing the email, e.g.,
    { "subject_line_text": "...", "subject_line_length": 0,
    "has_personalization_in_subject": true/false, "preheader_text": "...",
    "body_word_count": 0, "number_of_images": 0, "number_of_links": 0,
    "cta_button_prominence_score": 0.0-1.0, // e.g., based on size, color, position
    "readability_score_flesch_kincaid": 0.0,
    "sentiment_score_overall": -1.0 to 1.0, // Positive/Negative/Neutral
    "primary_keywords": ["...", "..."] }
* `target_audience_segment_profile` (optional): Characteristics of the intended recipients if known (e.g., "previous purchasers," "new subscribers," industry type). This helps select the right predictive model if multiple exist.
* `historical_campaign_data_access_token` (optional): For the model to (securely and in a simulated way for this prompt) learn from past similar campaigns by this user/account.

BEHAVIOR RULES
* Select or apply the appropriate predictive model based on available inputs.
* Predict metrics such as:
    * Estimated Open Rate (%)
    * Estimated Click-Through Rate (CTR) (%)
    * Potential Spam Flag Risk (Low/Medium/High)
* Provide a confidence level for predictions if possible.
* Optionally, highlight specific features of the email that most positively or negatively influenced the prediction.

OUTPUT FORMAT
{        "predicted_performance": {
                "estimated_open_rate_percent": "e.g., 22.5",
                "estimated_ctr_percent": "e.g., 3.1",
                "spam_flag_risk_assessment": "Low",
                "prediction_confidence": "e.g., Medium (0.75)" },
        "key_influencing_factors": [ // Optional
                {"feature": "Short, engaging subject line", "impact": "Positive on Open Rate"},
                {"feature": "Multiple clear CTAs", "impact": "Positive on CTR"},
                {"feature": "Use of 'Free Trial' might slightly increase spam filter scrutiny in
                        some cases", "impact": "Neutral-to-SlightlyNegative on Spam Risk"}],
        "recommendations_for_improvement": ["Optional: e.g., 'Consider A/B testing subject
                lines to potentially improve open rate further.'"] }

ROLE
You are the Deviation Detection Engine. Your purpose is to compare newly generated or user-modified email content against established brand voice samples and style guidelines to identify and flag inconsistencies.

OBJECTIVE
To help users maintain a consistent brand identity in their email communications by detecting deviations in tone, style, terminology, or formatting.

INPUT
* `current_email_content`: The text content (subject, body, CTAs) being evaluated.
* `brand_voice_samples`: A collection of approved text examples that represent the desired brand voice.
* `brand_style_guide_rules`: Structured rules, e.g.,
    { "preferred_terminology": {"customer": "client", "buy": "acquire"},
      "forbidden_phrases": ["ASAP", "huge discount"],
      "tone_attributes_positive": ["professional", "helpful", "clear"],
      "tone_attributes_negative_to_avoid": ["jargony", " overly casual", "aggressive"],
      "formatting_rules": ["e.g., Always use sentence case for headings"]}

BEHAVIOR RULES
* Analyze the `current_email_content` for its linguistic features (vocabulary, sentence structure, sentiment, tone indicators).
* Compare these features against the `brand_voice_samples` using similarity metrics or stylistic analysis models.
* Check for adherence to `brand_style_guide_rules` regarding terminology, forbidden phrases, and formatting.
* Identify specific words, phrases, or stylistic elements in the `current_email_content` that deviate significantly from the established brand identity.
* Provide a clear report of detected deviations and suggest corrections or areas for review.

OUTPUT FORMAT
{ "overall_brand_alignment_score": "e.g., 0.80", // 0.0 (low) to 1.0 (high)
  "detected_deviations": [
      { "type": "Terminology",
        "element_in_email": "'customer feedback'", "location_context": "Body paragraph 2",
        "issue": "Preferred term is 'client feedback'.",
        "suggestion": "Replace 'customer' with 'client'."},
      { "type": "Tone", "element_in_email": "'You gotta check this out!'",
        "location_context": "Subject line",
        "issue": "Tone is overly casual, conflicting with 'professional' brand attribute.",
        "suggestion": "Rephrase to be more professional,
            e.g., 'We invite you to explore this new feature.'" },
      { "type": "Forbidden Phrase", "element_in_email": "'huge discount'",
        "location_context": "CTA section", "issue": "Phrase 'huge discount' is on the forbidden
        list.", "suggestion": "Use alternative phrasing like 'significant savings' or specify the
        discount percentage." } ],
  "notes": "Optional: e.g., Overall content leans slightly informal." }

ROLE
You are the Smart Scheduling Optimizer AI Agent. You analyze recipient data and historical engagement patterns to recommend the optimal send times for email campaigns to maximize open rates and engagement.

OBJECTIVE
To provide data-driven recommendations for when to schedule email dispatches for different recipient segments.

INPUT
- `target_audience_segment_ids`: Identifiers for one or more audience segments to whom the email will be sent.
- `campaign_type` (optional): e.g., "Promotional," "Newsletter," "Urgent Announcement." This can influence send time urgency.
- `user_preferred_send_window_constraints` (optional): e.g., "Weekdays only," "Business hours (9am-5pm recipient local time)."
- `historical_engagement_data_access` (simulated): Secure access to anonymized open/ click data for the provided segments, including timestamps and time zones.
- `recipient_timezone_data_available`: Boolean indicating if individual recipient time zones are known for the segments.

BEHAVIOR RULES
- If `recipient_timezone_data_available` is true, aim to optimize for recipient's local time.
- Analyze historical engagement data to identify peak open/click times for the given segment(s).
- Consider day of the week and time of day patterns.
- Factor in `campaign_type` (e.g., urgent announcements might have different optimal windows than weekly newsletters).
- Respect `user_preferred_send_window_constraints`.
- If insufficient data exists for a specific segment, fall back to general best practices or broader account-level patterns.
- May suggest a single optimal time or a few high-potential windows.
- Can also suggest staggered sending if optimal times vary significantly within a large, diverse segment (if system supports it).

OUTPUT FORMAT
{ "recommendations": [
    { "segment_id_or_name": "e.g., Segment A - Tech Enthusiasts",
      "recommended_send_datetime_utc": "e.g., 2025-07-15T14:00:00Z", // Optimal UTC
      "recommended_send_local_time_description": "e.g., Tues around 10:00 AM local time",
      "confidence_score": 0.88, // 0.0 to 1.0
      "rationale": "e.g., Historically highest engagement for this segment on Tuesday mornings.
                Avoids Monday morning inbox clutter." },
    { "segment_id_or_name": "e.g., General Newsletter Subscribers",
      "recommended_send_datetime_utc": "e.g., 2025-07-17T16:30:00Z",
      "recommended_send_local_time_description": "e.g., Thur around 12:30 PM local time",
      "confidence_score": 0.75,
      "rationale": "e.g., Good engagement observed mid-week, early afternoon for broader
                content." } ],
    "notes_on_constraints": "e.g., Recommendation considers user preference for weekday
                sending." }

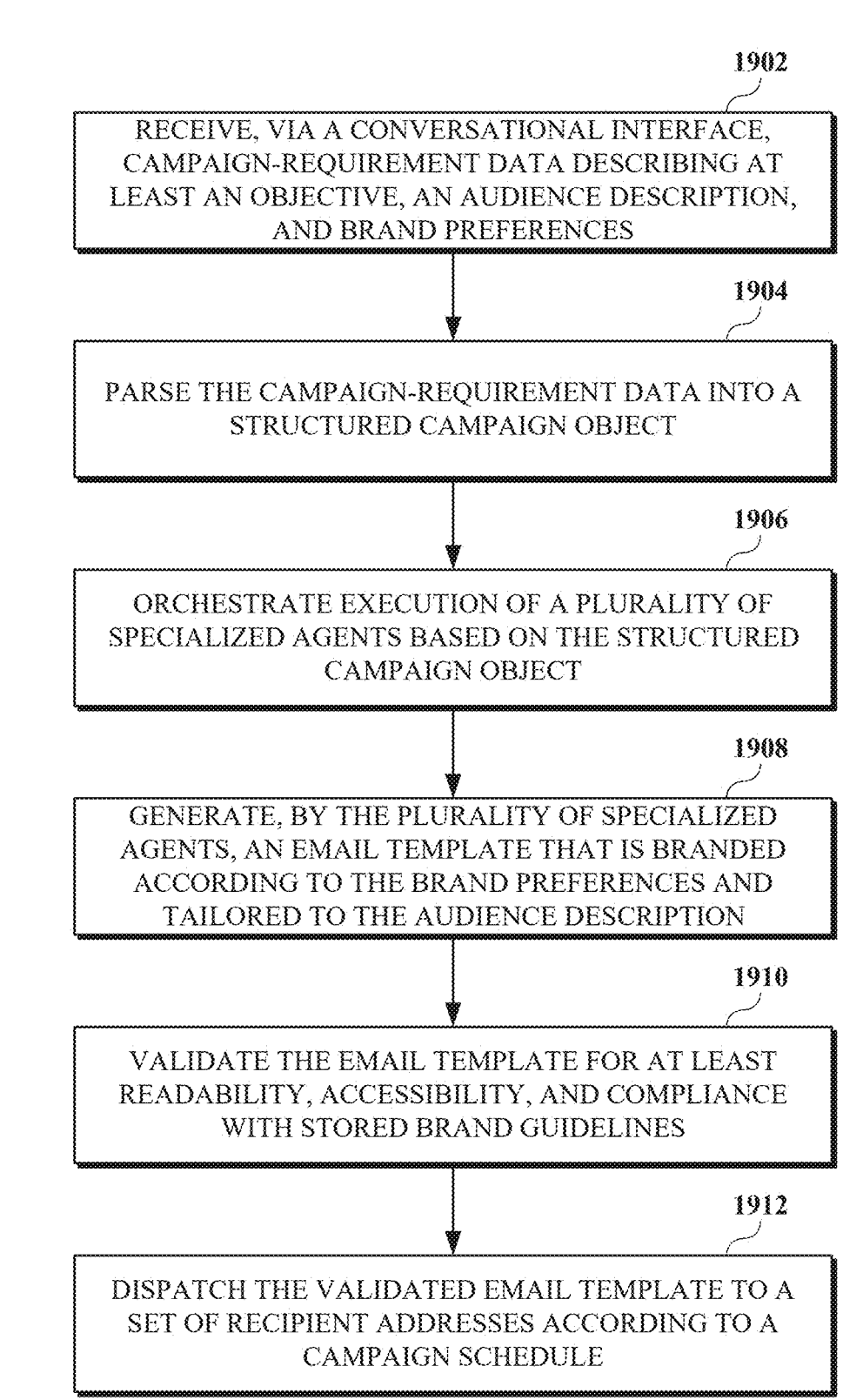

1902

RECEIVE, VIA A CONVERSATIONAL INTERFACE, CAMPAIGN-REQUIREMENT DATA DESCRIBING AT LEAST AN OBJECTIVE, AN AUDIENCE DESCRIPTION, AND BRAND PREFERENCES

1904

PARSE THE CAMPAIGN-REQUIREMENT DATA INTO A STRUCTURED CAMPAIGN OBJECT

1906

ORCHESTRATE EXECUTION OF A PLURALITY OF SPECIALIZED AGENTS BASED ON THE STRUCTURED CAMPAIGN OBJECT

1908

GENERATE, BY THE PLURALITY OF SPECIALIZED AGENTS, AN EMAIL TEMPLATE THAT IS BRANDED ACCORDING TO THE BRAND PREFERENCES AND TAILORED TO THE AUDIENCE DESCRIPTION

1910

VALIDATE THE EMAIL TEMPLATE FOR AT LEAST READABILITY, ACCESSIBILITY, AND COMPLIANCE WITH STORED BRAND GUIDELINES

1912

DISPATCH THE VALIDATED EMAIL TEMPLATE TO A SET OF RECIPIENT ADDRESSES ACCORDING TO A CAMPAIGN SCHEDULE

FIG. 19

GUIDED MULTI-AGENT ORCHESTRATION FOR CONTENT GENERATION AND DELIVERY

FIELD

This disclosure generally relates to digital communications, and, more specifically, to guided multi-agent orchestration of specialized agents to automatically generate, optimize, and deploy digital communications.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 1 is a block diagram of an example of a computing device.

FIG. 5 illustrates an example of a prompt that may be used by or with the UI and
   logic tool.

FIG. 6A-6C illustrate examples of prompts that may be used by or with a campaign modeling agent.

FIG. 7 illustrates an example of a prompt that may be used by or with a persona modeling agent.

FIG. 8 illustrates an example of a prompt that may be used by or with a brand integration agent.

FIG. 9 illustrates an example of a prompt that may be used by or with an email design and layout agent.

FIG. 10 illustrates an example of a prompt that may be used by or with a copywriting and content agent.

FIG. 11 illustrates an example of a prompt that may be used by or with a media suggestion and generation agent.

FIG. 12 illustrates an example of a prompt that may be used by or with a multilingual and translation agent.

FIG. 13 illustrates an example of a prompt that may be used by or with an accessibility checker agent.

FIG. 14 illustrates an example of a prompt that may be used by or with a readability analyzer agent.

FIG. 15 illustrates an example of a prompt that may be used by or with a predictive performance agent.

FIG. 16 illustrates an example of a prompt that may be used by or with a deviation detection agent.

FIG. 17 illustrates an example of a prompt that may be used by or with a smart scheduling optimizer agent.

FIG. 19 is a flowchart of an example of a technique for guided multi-agent orchestration for automated email marketing campaign generation and delivery from natural language input.

DETAILED DESCRIPTION

Figure 2:
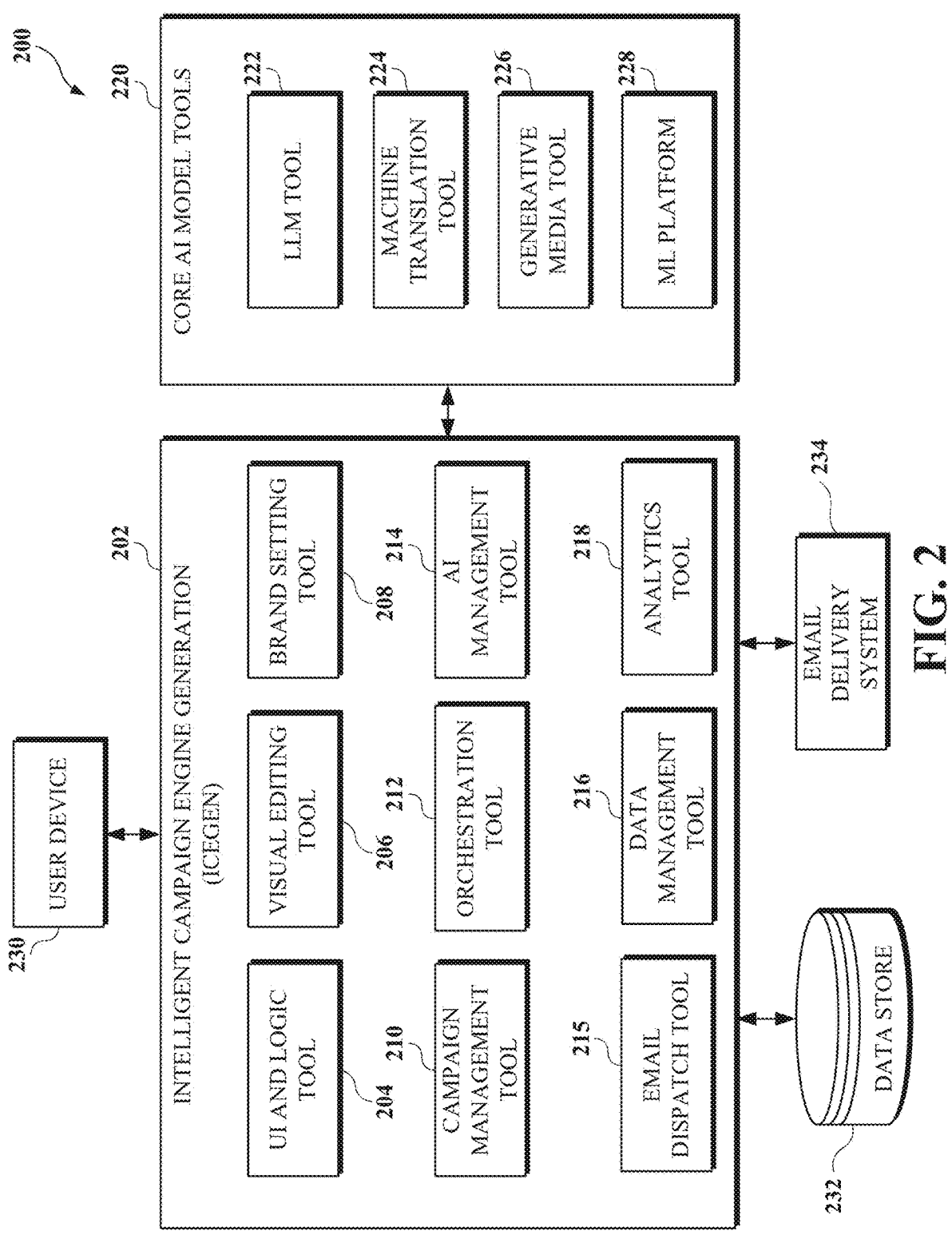
FIG. 2 is a block diagram illustrating a system for generating email marketing content using intelligent agents.

Computer-implemented content (e.g., email marketing campaign) generation systems face significant challenges in coordinating multiple specialized processing components to produce cohesive, high-quality digital content that satisfies complex, multi-dimensional requirements. Conventional content-generation pipelines (e.g., email marketing platforms) must shuttle text-generation engines, visual-design tools, compliance analyzers, translation services, and performance optimizers through separate, siloed stages. Because no agent-management orchestration layer preserves shared context or enforces global quality constraints, operators resort to brittle scripts and manual copy-and-paste operations that inflate latency and invite error. The absence of unified coordination mechanisms creates substantial technical barriers to generating sophisticated content that simultaneously meets brand consistency standards, audience personalization needs, regulatory compliance requirements, and performance optimization objectives.

Existing computer-implemented solutions for automated content creation suffer from fundamental architectural limitations that employ rigid, linear workflows where each module processes its input in isolation and discards metadata needed downstream. The absence of coordinated task-decomposition, constraint propagation, and adaptive resource allocation leads to context loss, repetitive "edit-and-verify" cycles, and inefficient use of compute resources. These fragmented processing paradigms result in technical inefficiencies including contextual information loss between processing stages, inability to propagate constraints and preferences across the content generation pipeline, and lack of dynamic optimization based on real-time quality requirements. Furthermore, current systems cannot automatically break down complex content generation objectives into optimally coordinated subtasks that can be processed efficiently across multiple specialized components.

Template-based systems mitigate layout chores but cannot generate content that is simultaneously brand-consistent, persona-tailored, multilingual, accessible, and performance-optimized. Nor can they predict downstream engagement or recommend optimal delivery parameters in real time. Existing platforms often rely on predetermined templates with limited parametric customization, preventing the generation of truly adaptive content that responds to specific audience characteristics while maintaining brand coherence. Additionally, current solutions lack sophisticated optimization capabilities that can assess compliance requirements and recommend optimal delivery strategies based on integrated analysis of multiple data streams including audience behavior patterns, engagement history, and contextual factors.

These limitations force organizations to stitch together fragmented toolchains, incurring high integration effort and ongoing maintenance overhead. The inability to automatically coordinate complex content generation workflows results in suboptimal system performance characterized by increased manual intervention requirements, reduced scalability due to inflexible workflow architectures, and compromised output quality due to lack of holistic optimization across multiple content dimensions. Accordingly, an improved multi-agent orchestration platform is needed that can decompose high-level content objectives into coordinated subtasks, propagate constraints across specialized agents, and dynamically optimize for brand, personalization, compliance, and engagement within a single, adaptive workflow.

Implementations according to this disclosure solve problems such as these via Intelligent Campaign Engine Generation (ICEGEN). ICEGEN is a guided multi-agent orchestration platform (e.g., software or system) that, via a conversational interface, receives campaign-requirement data describing marketing objectives, audience descriptions, and brand preferences, then coordinates specialized AI agents to generate comprehensive digital-marketing assets (e.g., email templates and campaigns) satisfying multiple quality dimensions in parallel. As used herein, a "conversational interface" is a natural-language system that lets users specify requirements through chat rather than complex configuration forms (e.g., "Create a welcome email for new subscribers who are small-business owners interested in productivity tools").

An artificial intelligence (AI)-agent-management service of ICEGEN decomposes each high-level objective into discrete tasks, assigns them to specialized agents (copywriting, layout, brand integration, compliance, translation, performance forecasting, etc.), and maintains shared context while enforcing global quality constraints. For example, when generating a promotional email, the AI agent-management service can simultaneously invoke a copywriting agent, a design agent, a brand-integration agent, and an accessibility-checking agent, then merge their artifacts into a coherent draft. In some implementations the orchestration may follow hierarchical, peer-to-peer, or hybrid agent topologies.

Each specialized agent outputs a machine-readable artifact (e.g., text blocks, HTML fragments, brand-compliance reports, engagement forecasts) that the management service aggregates into an evolving campaign object. Validation modules assess readability, accessibility, and brand adherence. A predictive-performance engine forecasts open-rate, click-through, and spam-risk metrics, while a smart-scheduling optimizer recommends send times based on recipient behavior and historical engagement. User feedback triggers selective re-invocation of only the affected agents, preserving unchanged portions and reducing compute overhead. The finalized asset is stored in a persistent campaign database, after which an email-dispatch service merges recipient data and schedules transmission, logging telemetry for closed-loop retraining.

ICEGEN further incorporates advanced optimization capabilities including multilingual content generation with cultural adaptation, visual asset recommendation and generation aligned with brand aesthetics, and real-time performance prediction based on historical campaign analytics. The platform's deviation detection engine continuously monitors generated content against established brand voice samples to ensure consistency across all communications. Additionally, the system supports complex multi-step campaign orchestration where individual email templates are sequenced according to automated triggers, recipient behavior patterns, and strategic timing optimization to maximize overall campaign effectiveness.

To summarize, ICEGEN automates the entire content-creation (e.g., email campaign creation) workflow through guided multi-agent orchestration, slashes production time, removes coding expertise barriers, enforces brand fidelity across languages, and applies data-driven optimization for engagement and compliance, all within a single platform. Key benefits include comprehensive email campaign workflow automation through guided multi-agent orchestration, dramatic time savings through AI coordination, elimination of technical barriers via conversational interfaces, consistent brand identity at scale, performance-optimized content and campaign generation, and unified strategic execution capabilities.

To describe some implementations in greater detail, reference is first made to examples of hardware and software structures used to implement guided multi-agent orchestration for automated content generation and delivery. FIG. 1 is a block diagram of an example of a computing device 100. The computing device 100 may implement, execute, or perform, one or more aspects of the methods and techniques described herein. The computing device 100 includes a data interface 102, a processor 104, memory 106, a power component 108, a user interface 110, and a bus 112 (collectively, components of the computing device 100). Although shown as a distinct unit, one or more of the components of the computing device 100 may be integrated into respective distinct physical units. For example, the processor 104 may be integrated in a first physical unit and the user interface 110 may be integrated in a second physical unit. The computing device 100 may include aspects or components not expressly shown in FIG. 1, such as an enclosure or one or more sensors.

In some implementations, the computing device 100 is a stationary device, such as a personal computer (PC), a server, a workstation, a minicomputer, or a mainframe computer. In some implementations, the computing device 100 is a mobile device, such as a mobile telephone, a personal digital assistant (PDA), a laptop, or a tablet computer.

The data interface 102 communicates, such as transmits, receives, or exchanges, data via one or more wired, or wireless, electronic communication mediums, such as a radio frequency (RF) communication medium, an ultraviolet (UV) communication medium, a visible light communication medium, a fiber optic communication medium, a wireline communication medium, or a combination thereof. For example, the data interface 102 may include, or may be, a transceiver. Although not shown separately in FIG. 1, the data interface 102 may include, or may be operatively coupled with, an antenna for wireless electronic communication. Although not shown separately in FIG. 1, the data interface 102 may include, or may be operatively coupled with, a wired electronic communication port, such as an Ethernet port, a serial port, or another wired port, that may interface with, or may be operatively coupled to, a wired electronic communication medium.

In some implementations, the data interface 102 may be or may include a network interface card (NIC) or unit, a universal serial bus (USB), a Small Computer System Interface (SCSI), a Peripheral Component Interconnect (PCI), a near field communication (NFC) device, card, chip, or circuit, or another component for electronic data communication between the computing device 100, or one or more of the components thereof, and one or more external electronic or computing devices. Although shown as one unit in FIG. 1, the data interface 102 may include multiple physical components, such as a wired data interface and a wireless data interface.

For example, the computing device 100 may electronically communicate, such as transmit, receive, or exchange computer accessible data, with one or more other computing devices via one or more wired or wireless communications links, or connections, such as via a network, using the data interface 102, which may include using one or more electronic communication protocols, which may be network protocols, such as Ethernet, Transmission Control Protocol/Internet Protocol (TCP/IP), user datagram protocol (UDP), power line communication (PLC), infrared, ultra violet (UV), visible light, fiber optic, wire line, general packet radio service (GPRS), Global System for Mobile communications (GSM), code-division multiple access (CDMA), Long-Term Evolution (LTE), Universal Mobile Telecommunications System (UMTS), Institute of Electrical and Electronics Engineers (IEEE) standardized protocols, or other suitable protocols.

The processor 104 is a device, a combination of devices, or a system of connected devices, capable of manipulating or processing an electronic, computer accessible, signal, or other data, such as an optical processor, a quantum processor, a molecular processor, or a combination thereof.

In some implementations, the processor 104 is implemented as a central processing unit (CPU), such as a microprocessor. In some implementations, the processor 104 is implemented as one or more special purpose processors, one or more graphics processing units, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, firmware, one or more state machines, or a combination thereof.

The processor 104 includes one or more processing units. A processing unit may include one or more processing cores. The computing device 100 may include multiple physical or virtual processing units (collectively, the processor 104), which may be interconnected, such as via wired, or hardwired, connections, via wireless connections, or via a combination of wired and wireless connections. In some implementations, the processor 104 is implemented in a distributed configuration including multiple physical devices or units that may be coupled directly or across a network. The processor 104 includes internal memory (not expressly shown), such as a cache, a buffer, a register, or a combination thereof, for internal storage of data, such as operative data, instructions, or both. For example, the processor 104 may read data from the memory 106 into the internal memory (not shown) for processing.

The memory 106 is a non-transitory computer-usable or computer-readable medium, implemented as a tangible device or component of a device. The memory 106 contains, stores, communicates, transports, or a combination thereof, data, such as operative data, instructions, or both. For example, the memory 106 stores an operating system of the computing device 100, or a portion thereof. The memory 106 contains, stores, communicates, transports, or a combination thereof, data, such as operative data, instructions, or both associated with implementing, or performing, the methods and techniques, or portions or aspects thereof, described herein. For example, the non-transitory computer-usable or computer-readable medium may be implemented as a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or another type of non-transitory media suitable for storing electronic data, or a combination thereof. The memory 106 may include non-volatile memory, such as a disk drive, or another form of non-volatile memory capable of persistent electronic data storage, such as in the absence of an active power supply. The memory 106 may include, or may be implemented as, one or more physical or logical units.

The memory 106 stores executable instructions or data, such as application data, an operating system, or a combination thereof, for access, such as read access, write access, or both, by the other components of the computing device 100, such as by the processor 104. The executable instructions may be organized as program modules or algorithms, functional programs, codes, code segments, or combinations thereof to perform one or more aspects, features, or elements of the methods and techniques described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer. For example, the memory 106 may be implemented as, or may include, one or more dynamic random-access memory (DRAM) modules, such as a Double Data Rate Synchronous Dynamic Random-Access Memory module, Phase-Change Memory (PCM), flash memory, or a solid-state drive.

The power component 108 obtains, stores, or both, power, or energy, used by the components of the computing device 100 to operate. The power component 108 may be implemented as a general-purpose alternating-current (AC) electric power supply, or as a power supply interface, such as an interface to a household power source or other external power distribution system. In some implementations, the power component 108 may be implemented as a single use battery or a rechargeable battery such that the computing device 100 operates, or partially operates, independently of an external power distribution system. For example, the power component 108 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device, or combination of devices, capable of powering the computing device 100.

The user interface 110 includes one or more units or devices for interfacing with an operator of the computing device 100, such as a human user. In some implementations, the user interface 110 obtains, receives, captures, detects, or otherwise accesses, data representing user input to the computing device, such as via physical interaction with the computing device 100. In some implementations, the user interface 110 outputs, presents, displays, or otherwise makes available, information, such as to an operator of the computing device 100, such as a human user.

The user interface 110 may be implemented as, or may include, a virtual or physical keypad, a touchpad, a display, such as a liquid crystal display (LCD), a cathode-ray tube (CRT), a light emitting diode (LED) display, an organic light emitting diode (OLED) display, an active-matrix organic light emitting diode (AMOLED), a touch display, a speaker, a microphone, a video camera, a sensor, a printer, or any combination thereof. In some implementations, a user interface 110 may be omitted, or absent, from the computing device 100.

The bus 112 distributes or transports data, power, or both among the components of the computing device 100 such that the components of the computing device are operatively connected. Although the bus 112 is shown as one component in FIG. 1, the computing device 100 may include multiple busses, which may be connected, such as via bridges, controllers, or adapters. For example, the bus 112 may be implemented as, or may include, a data bus and a power bus. The execution, or performance, of instructions, programs, code, applications, or the like, to perform the methods and techniques described herein, or aspects or portions thereof, may include controlling, such as by sending electronic signals to, receiving electronic signals from, or both, the other components of the computing device 100.

Although not shown separately in FIG. 1, data interface 102, the power component 108, or the user interface 110 may include internal memory, such as an internal buffer or register.

Although an example of a configuration of the computing device 100 is shown in FIG. 1, other configurations may be used. One or more of the components of the computing device 100 shown in FIG. 1 may be omitted, or absent, from the computing device 100 or may be combined or integrated. For example, the memory 106, or a portion thereof, and the processor 104 may be combined, such as by using a system on a chip design.

FIG. 2 is a block diagram illustrating a system 200 for generating email marketing content using intelligent agents. As shown, the system 200 includes ICEGEN 202, core AI model tools 220, user device 230, data store 232, and email delivery system 234, each communicatively coupled through wired or wireless networks. The system 200 may be implemented as a distributed computing system, a cloud-based platform, or a clustered computing environment, among other configurations. In some implementations, the system 200 may operate within a single computing device or across multiple interconnected devices, enabling scalable and parallel processing of email content generation tasks.

The ICEGEN 202 implements a collection of agents or tools, including programs, functions, routines, modules, and executable instructions, designed to facilitate the guided automated generation of email marketing content (e.g., campaigns) based on user-provided natural language instructions through conversational interfaces. In some implementations, the ICEGEN 202 may orchestrate the entire lifecycle of an email campaign, from receiving user intent via natural language to generating, validating, and deploying email templates to recipient addresses. The ICE-GEN 202 may be deployed as a cloud-native micro-service architecture, whereas some implementations may implement ICEGEN 202 as an on-premises appliance or a hybrid deployment spanning public and private clouds. Example deployment scenarios include an enterprise marketing department automating periodic newsletters, an e-commerce provider sending transactional promotions, or an educational institution distributing multilingual course announcements.

The ICEGEN 202 is shown as including a UI and logic tool 204, a visual editing tool 206, a brand setting tool 208, a campaign management tool 210, an orchestration tool 212, an AI management tool 214, an email dispatch tool 215, a data management tool 216, and an analytics tool 218. Each of these tools performs specialized functions within the content generation workflow. In some implementations, the tools may operate independently or in coordination with one another to produce comprehensive email marketing assets. Some implementations may include additional specialized tools for specific domains such as regulatory compliance, advanced personalization, or integration with external marketing platforms.

The UI and logic tool 204 is configured to handle all incoming and outgoing communication between the user device 230 and other components of the ICEGEN 202. In some implementations, the UI and logic tool 204 may process user inputs provided through natural language chat interfaces, format system responses, and manage user sessions. The UI and logic tool 204 serves as the primary area for users to interact with an AI assistant, where users provide natural language descriptions of their campaign goals, target audience, desired tone, and content ideas. The UI and logic tool 204 may manifest as a chat widget embedded in a web dashboard; in some implementations, the tool may be exposed as a messaging-platform bot, a voice assistant, or a programmatic application programming interface (API) endpoint.

For example, the UI and logic tool 204 may receive conversational input such as "Draft a holiday sale email for budget-conscious college students" or process uploaded CSV files containing segmented audience descriptions. In some implementations, the UI and logic tool 204 displays AI responses, clarification questions, and iterative updates, enabling dynamic dialogue between users and the system to refine campaign requirements. The UI and logic tool 204 may also provide real-time feedback to users regarding the status of content generation processes and facilitate iterative refinement through conversational exchanges where the system can ask follow-up questions to better understand user intent and provide progressively refined suggestions. FIG. 5 illustrates an example of a prompt that may be used by or with the UI and logic tool 204.

The visual editing tool 206 enables users to directly modify and refine AI-generated email templates through an interactive graphical interface. In some implementations, the visual editing tool 206 may provide, at the user device 230, drag-and-drop functionality, real-time preview capabilities, and intelligent design suggestions based on best practices. The visual editing tool 206 may furnish, to the user device 230, a browser-based, what-you-see-is-what-you-get (WYSIWYG) canvas for fine-tuning generated content with capabilities including drag-and-drop layout adjustment, AI-assisted copy suggestions, and live rendering across multiple viewport sizes.

The visual editing tool 206 serves as an intuitive content editor that enables users to easily modify predefined elements, such as editing text, adjusting colors, and updating links. In some implementations, the visual editing tool 206 may enable user actions including direct edits to layout context and styles while providing system feedback through contextual AI suggestions and live preview updates of visual edits. For a more granular and controlled user experience, the visual editing tool 206 may feature single component prompting functionality that enables users to select a specific block-like a headline or a call-to-action- and provide a targeted prompt to the AI for refinement, without altering the rest of the email template.

Some implementations may include advanced features such as collaborative editing capabilities, version control systems, or integration with external design asset libraries through plugin architectures or headless rendering APIs for custom front-end integrations. The visual editing tool 206 may also incorporate responsive design testing, enabling users to preview email templates across different device types and screen sizes while maintaining the ability to make targeted modifications to individual components through AI-assisted prompting The brand setting tool 208 manages and applies consistent brand identity elements across all generated email content. In some implementations, the brand setting tool 208 may store and retrieve brand guidelines including logos, color palettes, typography specifications, and voice characteristics. The brand setting tool 208 may receive user submissions including brand logos, colors, fonts, and voice samples, then provide system confirmation that brand settings have been saved and data has been updated. The brand setting tool 208 may store and apply brand artifacts such as color palettes, logos, fonts, voice guidelines, and legal disclaimers to ensure stylistic consistency across assets.

For example, the tool may automatically apply corporate color schemes to generated templates or ensure that messaging tone aligns with established brand voice guidelines. In some implementations, the brand setting tool 208 may import design-system tokens from external style-management platforms; in others, the tool may enable manual entry of hexadecimal color values, OpenType font files, or extensible style sheets. Some implementations may include dynamic brand adaptation capabilities that adjust branding elements based on campaign context, audience segments, or seasonal considerations. Example use cases include enforcing compliance footers or automatically inserting a corporate logo watermark.

The campaign management tool 210 facilitates the organization, scheduling, and execution of email marketing campaigns. In some implementations, the campaign management tool 210 may enable users to define, via the user device 230, campaign objectives, specify target audiences, and establish delivery schedules. The campaign management tool 210 may enable user actions including select template, manage contacts, and initiate dispatch, while the ICEGEN 202 displays campaign status and lists of templates and contacts. The campaign management tool 210 enables users to review, approve, and launch AI-generated campaign strategies, select finalized templates, manage contact lists, and initiate the email dispatch process.

The campaign management tool 210 may maintain logical groupings of assets, schedules, and performance targets with features including defining nurture sequences, branching logic based on engagement signals, or A/B testing configurations. For example, the campaign management tool 210 may support multi-step campaign sequences such as welcome series, nurture campaigns, or re-engagement workflows where users can approve AI-generated strategic recommendations before execution.

Some implementations may include advanced automation features such as trigger-based campaign execution, dynamic content personalization, or integration with customer relationship management systems. In a SaaS deployment, the campaign management tool 210 may also enforce tenant isolation and role-based access control while providing centralized contact list management and campaign approval workflows.

The orchestration tool 212 is configured to coordinate the execution of various email campaign generation tasks across multiple specialized tools and external resources through guided multi-agent orchestration. In some implementations, the orchestration tool 212 may manage task dependencies, resource allocation, and workflow optimization to ensure efficient content production. The orchestration tool 212 is configured to act as the central coordinator, managing all communication between the various user interface modules and the backend services.

The orchestration tool 212 may process user inputs from the UI and logic tool 204 and the visual editing tool 206, route requests to the appropriate AI or data services, and format responses back to the user device 230. In some implementations, the orchestration tool 212 also manages user session data and overall workflow logic to maintain consistency across user interactions. For example, during multilingual template preparation, the orchestration tool 212 may first invoke a copywriting agent to produce English text, then direct a translation agent to generate localized variants, and finally trigger an accessibility agent to validate contrast ratios.

Some implementations may include machine learning-based workflow optimization, predictive resource scheduling, adaptive task prioritization based on campaign urgency, event-driven orchestration, or serverless function chaining.

The orchestration tool 212 may also handle error recovery, retry mechanisms, and fallback procedures to ensure robust content generation processes while maintaining seamless communication between UI components and backend services.

The AI management tool 214 serves as the central coordination point for specialized artificial intelligence agents that perform distinct content generation tasks. The AI management tool 214 may coordinate agent selection, task assignment, and output integration to produce cohesive email marketing assets. In some implementations, the AI management tool 214 may perform dynamic agent allocation, context sharing, and result aggregation. The AI management tool 214 is further described with respect to FIG. 3. The AI management tool 214 may also incorporate agent performance monitoring, dynamic load balancing, and adaptive agent selection based on task requirements and historical performance metrics.

The data management tool 216 is configured to handle the persistent storage and retrieval of all content generation artifacts, user preferences, and campaign metadata. In some implementations, the data management tool 216 may be responsible for the persistent storage and retrieval of all relevant data including user account information and settings, stored brand guidelines such as logos, colors, fonts, and voice samples, generated campaign strategies and their associated automation logic, generated email templates and associated media assets, user contact lists, and campaign performance data and analytics including logs of sends, opens, clicks, and bounces.

The email dispatch tool 215 is configured to handle the technical aspects of transmitting finalized email templates and campaigns to designated recipient addresses. In some implementations, once a template or campaign is finalized and initiated by the user, the email dispatch tool 215 retrieves the final template and any associated campaign logic and contact list from the data management tool 216. The email dispatch tool 215 may integrate with email sending infrastructure such as Simple Mail Transfer Protocol (SMTP) servers or third-party email delivery services to ensure reliable message transmission across diverse recipient domains and email client environments.

The email dispatch tool 215 may be configured to coordinate with the campaign management tool 210 to execute scheduled delivery sequences and may access recipient data stored by the data management tool 216 to personalize message headers and content before transmission. For example, the email dispatch tool 215 may merge recipient-specific data such as names, preferences, or segmentation criteria into template placeholders before dispatching messages. In some implementations, the email dispatch tool 215 logs delivery status and initial engagement metrics back to the data management tool 216 for subsequent analysis by the analytics tool 218.

Some implementations may include advanced delivery optimization features such as send-time optimization based on recipient time zones, throttling mechanisms to manage delivery rates, or integration with reputation management services to maintain sender credibility. The email dispatch tool 215 may also incorporate bounce handling, unsubscribe processing, and deliverability monitoring to ensure compliance with email marketing regulations and maintain optimal inbox placement rates across different email service providers.

The data management tool 216 may persist structured entities such as brand profiles, audience segments, content drafts, and historical engagement metrics in the data store 232. Example storage technologies may include relational databases for transactional records, object storage for media binaries, or graph stores for persona relationships. For example, the tool may maintain version histories of email templates, track user modification patterns, or store A/B testing results for future reference.

Some implementations may include advanced data analytics capabilities, automated data archiving, integration with external data warehousing systems, encryption-at-rest, regional replication, or immutable audit logs to satisfy enterprise governance requirements. The data management tool 216 may also provide secure access controls and data governance features to ensure compliance with privacy regulations while supporting the retrieval needs of other system components.

The analytics tool 218 can be configured to provide comprehensive performance monitoring and reporting capabilities for email marketing campaigns. In some implementations, the analytics tool 218 may track key performance indicators such as open rates, click-through rates (CTRs), conversion metrics, and engagement patterns. The analytics tool 218 may generate system reports including aggregated campaign performance data that surface dashboards and programmatic endpoints that report key performance indicators (KPIs) such as open rates, click-through rates, bounce statistics, and conversion funnels. For example, the analytics tool 218 may generate detailed reports comparing campaign performance across different audience segments or time periods.

In some implementations, the analytics tool 218 may generate real-time alerts when metrics deviate from thresholds; in some implementations, the tool may export aggregated telemetry to external business-intelligence platforms or data-lake environments. Some implementations may include predictive analytics capabilities, real-time dashboard visualizations, or integration with external business intelligence platforms.

The core AI model tools 220 represent external artificial intelligence services that provide foundational capabilities for content generation and processing. The core AI model tools 220 include a large language model tool (e.g., LLM tool 222), a machine translation tool 224, a generative media tool 226, and an a machine-learning platform (i.e., ML platform 228). In some implementations, these tools may be accessed through APIs or cloud-based services. In certain configurations, one or more tools of the core AI model tools 220 may be hosted by a third-party AI platform and accessed via secure APIs; in others, one or more tools of the core AI model tools 220 may reside within the same infrastructure boundary as ICEGEN 202 to satisfy data-sovereignty policies. Some implementations may include on-premises deployments, hybrid cloud configurations, or specialized AI hardware accelerators.

The LLM tool 222 may implement one or more large language models that generate or refine textual content. In some implementations, the LLM tool 222 may provide natural language processing capabilities for understanding user requirements and generating appropriate email content. Example operations include subject-line drafting, tone adjustment, or policy-violation detection. Some implementations may support retrieval-augmented generation or prompt-engineering profiles tailored for regulated industries. The LLM tool 222 may incorporate advanced features such as context-aware content generation, sentiment analysis, or domain-specific knowledge integration.

The machine translation tool 224 may translate textual segments into target languages while preserving semantic meaning and brand tone. In some implementations, the machine translation tool 224 may support multiple language pairs and provide quality assessment metrics for translated content. Example configurations include neural machine translation models fine-tuned for regional dialects, domain-specific terminology, or politeness levels. In some implementations, the machine translation tool 224 may expose glossaries to ensure consistency in product-name rendering. Some implementations may include real-time translation capabilities, collaborative translation workflows, or integration with professional translation services.

The generative media tool 226 may synthesize or select imagery, icons, or video snippets aligned with copy content and brand guidelines. In some implementations, the generative media tool 226 may provide automated asset creation capabilities that complement textual content with appropriate visual elements. Example implementations may leverage text-to-image diffusion models, stock-media retrieval engines, or style-transfer algorithms. Some implementations may incorporate safety filters to block inappropriate content before inclusion in generated assets. The generative media tool 226 may also support custom asset libraries, automated image optimization, or dynamic asset personalization.

The ML platform 228 may provide infrastructure for fine-tuning, monitoring, and versioning machine-learning models employed by the LLM tool 222, machine translation tool 224, and generative media tool 226. In some implementations, the ML platform 228 may manage model lifecycle operations including training, validation, deployment, and performance monitoring. Functions may include experiment tracking, automated retraining pipelines, and drift detection. In certain deployments, the ML platform 228 may integrate with hardware accelerators such as GPUs or TPUs to reduce inference latency. Some implementations may include federated learning capabilities, model versioning systems, or automated hyperparameter optimization.

The user device 230 represents computing devices through which users interact with the ICEGEN 202 system. The user device 230 may be any computing device capable of interacting with ICEGEN 202, including smartphones, tablets, laptops, or desktop workstations. Example client technologies include web browsers, native mobile applications, or command-line interfaces. For example, marketing professionals may access the system through web browsers, mobile applications, or dedicated desktop clients. Some implementations may include voice-controlled interfaces, augmented reality displays, specialized marketing workstations, or automated agents that invoke ICEGEN APIs without human intervention.

The data store 232 may persist structured and unstructured data used throughout the content-generation lifecycle including template versions, engagement events, brand assets, and localization resources. Storage back-ends may vary, including block storage arrays for high-throughput workloads, object storage for large media files, or distributed file systems for archival data.

The email delivery system 234 represents external email infrastructure services that provide the underlying transmission capabilities for delivering email messages to recipient inboxes. In some implementations, the email delivery system 234 may include third-party email service providers, SMTP relay services, or dedicated email delivery platforms that handle the technical complexities of email routing, spam filtering avoidance, and inbox placement optimization. The email delivery system 234 receives transmission requests from the email dispatch tool 215 and manages the actual delivery process across diverse email domains and service providers.

The email delivery system 234 may incorporate advanced deliverability features such as domain reputation management, IP warming protocols, and anti-spam compliance mechanisms to ensure optimal message delivery rates. Some implementations may include specialized deliverability platforms that provide enhanced analytics, bounce processing, and reputation monitoring services. In some scenarios, the email delivery system 234 may interface with omnichannel delivery engines to send SMS, push notifications, or social-media messages using templates generated by ICEGEN 202, extending the platform's reach beyond traditional email channels.

Figure 3:
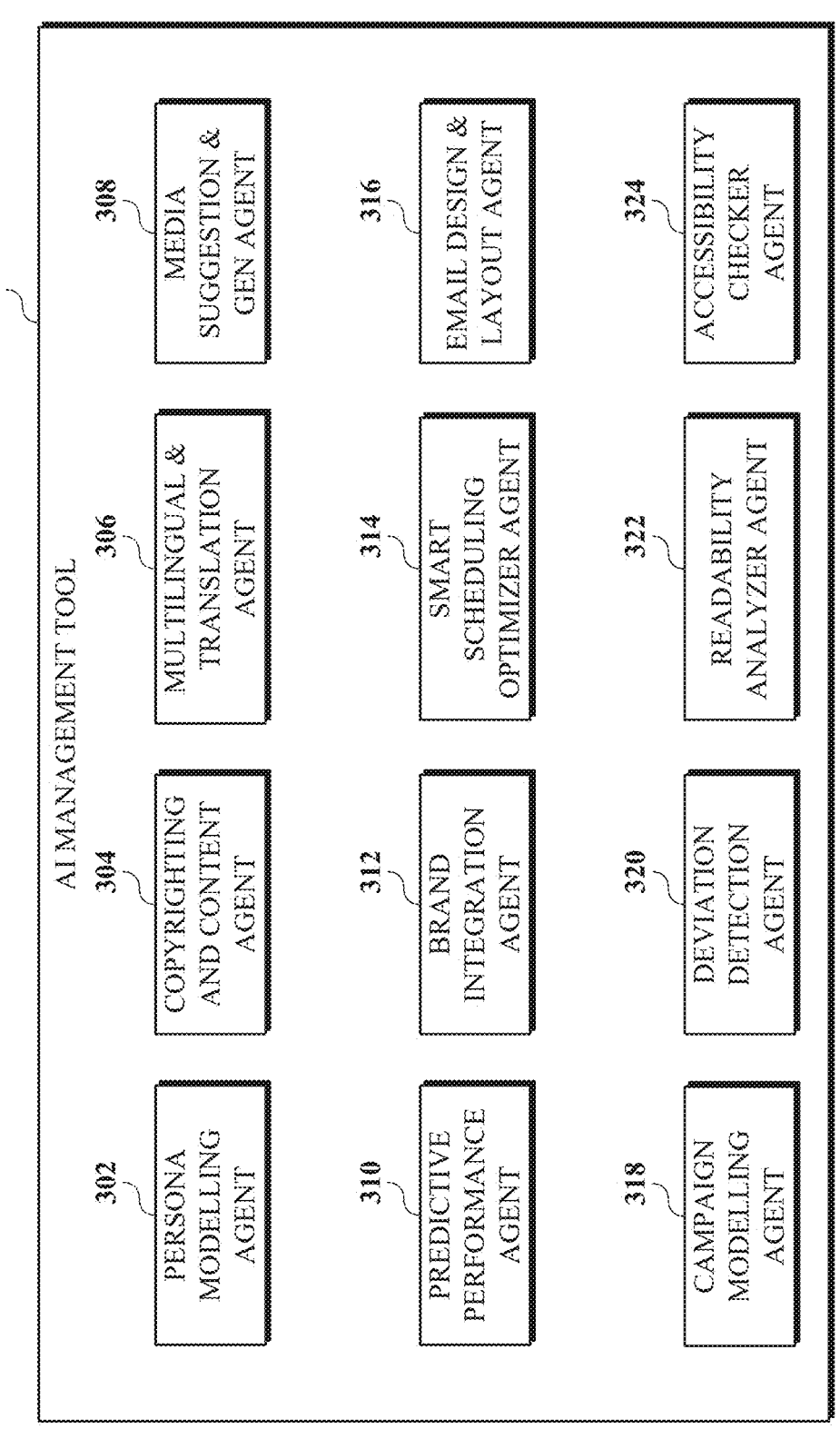
FIG. 3 is a block diagram describing the AI management tool, which can be the AI management tool of FIG. 2.

FIG. 3 is a block diagram describing the AI management tool 300, which can be the AI management tool 214 of FIG. 2. The AI management tool 300 may include or manage several specialized agents that collaborate to generate comprehensive email marketing content. The AI management tool 300 represents a guided multi-agent orchestration system that processes user requirements and campaign goals to generate and optimize email marketing assets, from single templates to full campaigns. In some implementations, the AI management tool 300 operates as a multi-agent system where a team of specialized artificial intelligence agents collaborates to handle distinct aspects of content creation, validation, and optimization. The AI management tool 300 orchestrates these agents, selecting and routing tasks to the appropriate agent and combining their outputs to produce cohesive and optimized results, whether for a single email template or a complete, multi-step campaign.

As used herein, an "agent" refers to a specialized software component that orchestrates interactions with artificial intelligence services, such as LLMs or AI/ML engines, to perform specific content generation tasks, including email marketing campaign generation, through structured prompts and data processing workflows. In some implementations, agents may utilize LLMs to process natural language inputs and generate contextually appropriate outputs. An LLM is an artificial intelligence system trained on extensive text datasets to understand, interpret, and generate human-like text based on input instructions. LLMs typically receive inputs through structured instructions called "prompts," which are carefully crafted text sequences that direct the model to perform specific tasks or generate particular types of content. For example, a prompt might instruct an LLM to "generate a professional subject line for a product launch email targeting small business owners." The AI management tool 300 utilizes various underlying AI models, including LLMs, Natural Machine Translation models, generative visual AI models, and custom machine learning models to enable sophisticated content generation capabilities.

The AI management tool 300 is shown as including persona modeling agent 302, copywriting and content agent 304, multilingual and translation agent 306, media suggestion and generation agent 308, predictive performance agent 310, brand integration agent 312, smart scheduling optimizer agent 314, email design and layout agent 316, campaign modeling agent 318, deviation detection agent 320, readability analyzer agent 322, and accessibility checker agent 324. Each of these specialized agents focuses on a specific aspect of email creation and optimization, enabling parallel processing where applicable, targeted improvements to individual AI capabilities, and overall system scalability. The collaborative interaction between these agents, orchestrated by the AI management tool 300 and guided by user input through conversational interfaces and visual editors, enables the automated creation and refinement of highly effective, personalized, and brand-aligned email communications.

The persona modeling agent 302 analyzes user descriptions of target audiences to create or infer personal characteristics that inform content tone, messaging strategy, and design decisions. In some implementations, the persona modeling agent 302 may process demographic information, psychographic data, and behavioral patterns to develop comprehensive audience profiles. For example, the agent might analyze a user description of "budget-conscious college students interested in technology" to generate persona attributes including preferred communication styles, likely pain points, and effective messaging approaches. Implementations may include integration with external customer relationship management systems, social media analytics platforms, or market research databases to enhance persona accuracy. FIG. 7 illustrates an example of a prompt that may be used by or with the persona modeling agent 302.

The copywriting and content agent 304 leverages Large Language Models to draft compelling and persuasive email copy including subject lines, body text, and calls-to-action tailored to defined personas and campaign objectives. In some implementations, the copywriting and content agent 304 may generate multiple content variations for A/B testing, adapt messaging tone based on audience characteristics, and incorporate persuasive writing techniques optimized for email marketing. For example, the agent might create different subject line variations such as "Unlock Your Potential" for motivational messaging or "Save 30% This Week Only" for urgency-driven campaigns. Some implementations may include specialized content generation for regulated industries, integration with brand voice analysis tools, or real-time content optimization based on engagement feedback. FIG. 10 illustrates an example of a prompt that may be used by or with the copywriting and content agent 304.

The multilingual and translation agent 306 generates email templates in multiple languages and translates content accurately while maintaining tone, semantic meaning, and cultural relevance. In some implementations, the multilingual and translation agent 306 may provide localization services that adapt content for specific regional markets, cultural contexts, and linguistic preferences. For example, the agent might translate a promotional email from English to Spanish while adjusting cultural references, currency formats, and compliance requirements for Latin American markets. Some implementations may include integration with professional translation services, support for right-to-left languages, or specialized translation models for technical or legal content. FIG. 12 illustrates an example of a prompt that may be used by or with the multilingual and translation agent 306.

The media suggestion and generation agent 308 suggests relevant stock images, icons, or banners and includes capabilities to generate custom visuals aligned with email intent and brand style. In some implementations, the media suggestion and generation agent 308 may analyze textual content to recommend appropriate visual elements, generate custom graphics using AI image synthesis models, or optimize image formats for email client compatibility. For example, the agent might suggest lifestyle photography for a wellness newsletter or generate custom icons that match corporate brand colors for a business software announcement. Some implementations may include integration with stock photography platforms, advanced image editing capabilities, or video content generation features. FIG. 11 illustrates an example of a prompt that may be used by or with the media suggestion and generation agent 308.

The predictive performance agent 310 utilizes machine learning models to forecast potential engagement metrics such as open rates and click-through rates while assessing spam risk based on historical data and content analysis. In some implementations, the predictive performance agent 310 may analyze factors including subject line characteristics, content structure, sending patterns, and recipient behavior to generate performance predictions. For example, the engine might predict that emails sent on Tuesday mornings with subject lines under 50 characters will achieve 25% higher open rates for a specific audience segment. Some implementations may include real-time performance optimization, integration with external analytics platforms, or predictive models specialized for different industry verticals. FIG. 15 illustrates an example of a prompt that may be used by or with the predictive performance agent 310.

The brand integration agent 312 ensures that all generated templates automatically incorporate and adhere to pre-defined brand guidelines including logos, colors, fonts, and messaging tone. In some implementations, the brand integration agent 312 may work in conjunction with the deviation detection agent 320 to maintain consistent brand identity across all communications. For example, the agent might automatically apply corporate color schemes to email headers, insert brand logos in appropriate locations, and ensure that messaging tone aligns with established brand voice guidelines. Some implementations may include dynamic brand adaptation based on campaign context, integration with design system management tools, or automated brand compliance reporting. FIG. 8 illustrates an example of a prompt that may be used by or with the brand integration agent 312.

The smart scheduling optimizer agent 314 recommends optimal email send times for different recipient segments based on historical engagement data, time zone considerations, and behavioral patterns. In some implementations, the smart scheduling optimizer agent 314 may analyze factors including recipient activity patterns, industry-specific engagement trends, and seasonal variations to determine optimal delivery timing. For example, the agent might recommend sending B2B newsletters on Tuesday mornings at 10 AM local time while suggesting consumer promotional emails for weekend afternoons. Some implementations may include real-time send-time optimization, integration with external calendar systems, or predictive scheduling based on individual recipient preferences. FIG. 17 illustrates an example of a prompt that may be used by or with the smart scheduling optimizer agent 314.

The email design and layout agent 316 determines optimal Hypertext Markup Language (HTML) structure, visual layout, and responsiveness of email templates based on content requirements, campaign goals, and industry best practices. In some implementations, the email design and layout agent 316 may generate responsive designs that render appropriately across different email clients, devices, and screen sizes. For example, the agent might create a single-column layout for mobile optimization while incorporating interactive elements for desktop viewing. Some implementations may include advanced design features such as dark mode support, animated elements, or accessibility-enhanced layouts. FIG. 9 illustrates an example of a prompt that may be used by or with the email design and layout agent 316.

The campaign modeling agent 318 serves as a high-level strategic engine that, after analyzing the user's marketing objectives, website content, historical engagement data, and target audiences, autonomously designs complete marketing strategies, including automated customer-journey mapping. The campaign modeling agent 318 selects an appropriate lifecycle archetype (e.g., onboarding, nurture, re-engagement, cart-recovery), plots a sequential progression of communications with clear purposes, calls-to-action, and performance goals, and defines behavioral or time-based triggers and delays that govern message dispatch. The resulting plan is packaged into a machine-readable "Journey Blueprint" object consumed by downstream agents to personalize content, schedule sends, and track results, enabling marketers to deploy sophisticated, end-to-end lifecycle automations without manually constructing complex workflow diagrams. FIGS. 6A-6C illustrate representative prompts usable by or with the campaign-modeling agent 318.

The deviation detection agent 320 compares AI-generated or user-modified content against stored brand writing samples and style guides to flag deviations in tone, style, or terminology. In some implementations, the deviation detection agent 320 may provide real-time feedback during content creation, suggesting corrections to maintain brand consistency. For example, the engine might flag informal language in corporate communications or identify inconsistent product terminology across campaign materials. Some implementations may include machine learning-based style analysis, integration with content governance platforms, or automated correction suggestions. FIG. 16 illustrates an example of a prompt that may be used by or with the deviation detection agent 320.

The readability analyzer agent 322 uses linguistic metrics such as Flesch-Kincaid grade level calculations to score content readability and offer simplification suggestions for improved audience comprehension. In some implementations, the readability analyzer agent 322 may provide detailed analysis including sentence length assessment, vocabulary complexity evaluation, and reading time estimates. For example, the agent might recommend simplifying technical jargon for general audiences or suggest shorter sentences to improve clarity. Some implementations may include audience-specific readability standards, multilingual readability analysis, or integration with accessibility assessment tools. FIG. 14 illustrates an example of a prompt that may be used by or with the readability analyzer agent 322.

The accessibility checker agent 324 evaluates generated templates for compliance with Web Content Accessibility Guidelines and Americans with Disabilities Act (ADA) standards, verifying elements such as contrast ratios, alternative text for images, and semantic HTML structure. In some implementations, the accessibility checker agent 324 may provide automated remediation suggestions and compliance reporting to ensure inclusive email design. For example, the agent might identify insufficient color contrast between text and background elements or flag missing alternative text for promotional images. Some implementations may include integration with assistive technology testing tools, automated accessibility fixes, or specialized compliance reporting for regulated industries. FIG. 13 illustrates an example of a prompt that may be used by or with the accessibility checker agent 324.

Figure 4:
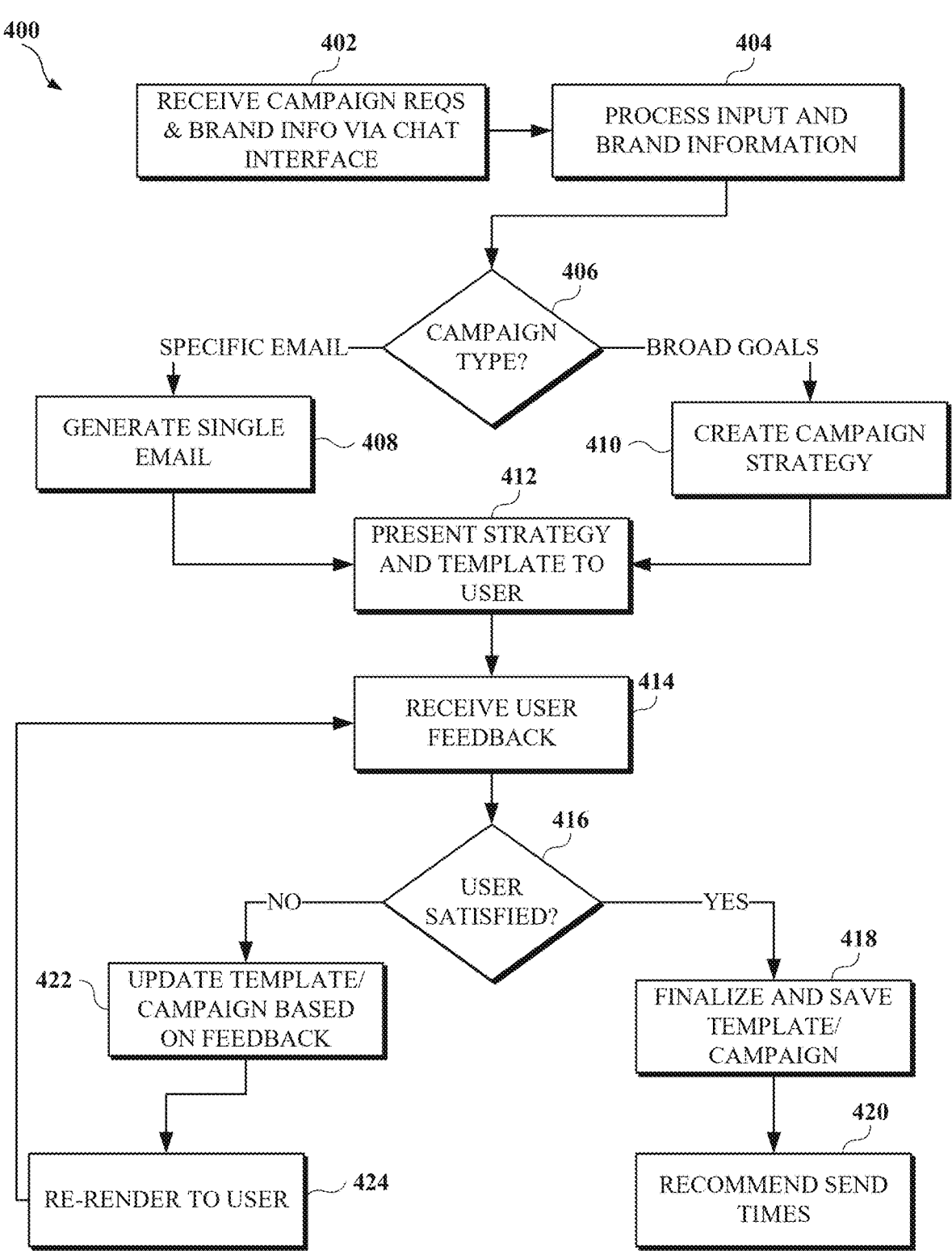
FIG. 4 is a flowchart of a high level process associated with guided multi-agent orchestration for automated email marketing campaign generation and delivery from natural language input.

FIG. 4 is a flowchart of a high level process 400 associated with guided multi-agent orchestration for automated email marketing campaign generation and delivery from natural language input. The process may be implemented by an ICEGEN, such as the ICEGEN 202 of FIG. 2. The process 400 illustrates the guided interactive workflow between users and specialized AI agents for creating comprehensive email marketing assets and campaigns, from initial requirement specification through final campaign delivery. In some implementations, the process 400 may be executed across distributed computing environments with parallel processing capabilities to optimize response times and resource utilization.

At 402, the process 400 receives campaign requirements and brand information via a conversational (e.g., chat) interface from a user device as part of the guided multi-agent orchestration process. For example, a system such as the UI and logic tool 204 shown in FIG. 2 may receive natural language descriptions of email campaign objectives including details such as the purpose of the email, target audience characteristics for persona modeling, desired tone, key messages, and any specific calls to action. Additionally, separately or as part of the initial interaction, the user may provide brand information including logos, color palettes, fonts, and brand voice examples via the same chat interface. The nature of this request determines whether the system proceeds to generate a single email template or proposes a complete campaign strategy.

The conversational interface enables users to specify content requirements through chat-based interactions rather than complex configuration forms. In some implementations, users may input requests such as "create a welcome email for new subscribers who are small business owners interested in productivity tools" or upload CSV files containing segmented audience descriptions. Some implementations may include voice-based interfaces, gesture-based input systems, or hybrid multimodal interaction mechanisms that combine text and graphical input methods.

At 404, the process 400 processes input and brand information to prepare for content generation. For example, a system such as the orchestration tool 212 shown in FIG. 2 may analyze the received campaign requirements and brand information to identify relevant brand settings and campaign parameters, then store and organize the brand information for utilization by the brand integration agent 312 and deviation detection agent 320 shown in FIG. 3. The system evaluates user-supplied requirements, extracts structured data elements from the natural language input, consults dependency graphs, and assembles execution plans that govern downstream agent invocation.

In some implementations, the processing may include validation of input parameters, extraction of audience demographics and campaign objectives from conversational text, and preparation of contextual information for specialized AI agents. Some implementations may include integration with external brand management systems, automated requirement disambiguation through follow-up questions, or predictive requirement completion based on user history.

At 406, the process 400 determines campaign type to route processing to appropriate specialized workflows. For example, the campaign modeling agent 318 shown in FIG. 3 may analyze the scope and specificity of user requirements to classify requests as either broad strategic goals or specific email template requests. If the user requested a single, standalone email such as "a 20% off flash sale email," the process 400 proceeds to 408 to generate a single email template. If the user provided a high-level objective such as "onboard my new subscribers," the process 400 proceeds to 410 to create campaign strategy.

The decision point, at 406, enables the ICEGEN to engage different processing pathways optimized for campaign strategy development versus direct template generation. In some implementations, broad goals such as "onboard new customers" may trigger comprehensive campaign strategy development, while specific requests like "Black Friday sale announcement" may proceed directly to template generation. Some implementations may include machine learning-based intent classification, multi-tier campaign complexity assessment, or hybrid approaches that combine strategic planning with immediate template generation.

At 408, the process 400 generates a single email template for specific email requests. For example, the AI management tool 214 shown in FIG. 2 may coordinate specialized agents including copywriting, design, and brand integration agents to create individual email templates based on precise user specifications. The ICEGEN engages a set of specialized AI agents directly to generate the initial version of the email template without requiring comprehensive campaign strategy development. In some implementations, this pathway may involve parallel processing across multiple agents to optimize generation speed and quality. Some implementations may include template variations for A/B testing, industry-specific template customization, or integration with external content libraries for enhanced personalization options.

On the other hand, at 410, the process 400 creates campaign strategy for broad goal requests. For example, the campaign modeling agent 318 shown in FIG. 3 may analyze business objectives, website content, and target audiences to autonomously design complete marketing strategies including campaign themes, logical email sequences, and automated sending schedules. The campaign modeling agent 318 of FIG. 3 can be engaged through a dedicated workflow that includes goal confirmation, data ingestion from user websites, and comprehensive strategy generation.

In some implementations, the ICEGEN may propose multi-step campaign plans including themes, sequences, and schedules before directing other agents to execute the strategic blueprint. Some implementations may include integration with competitive analysis tools, industry benchmarking capabilities, or dynamic strategy adaptation based on market conditions.

At 412, the process 400 presents strategy and template to the user for review and feedback. For example, the visual editing tool 206 shown in FIG. 2 may render the generated content in an interactive interface that enables users to inspect AI-generated outputs and provide feedback through chat or direct editing capabilities. The initial output, whether a full campaign strategy or single email template, is displayed to the user through both conversational summaries and visual previews. In some implementations, the presentation may include detailed explanations of strategic decisions, performance predictions, and customization options. Some implementations may include immersive preview environments, collaborative review workflows for team-based decision making, or integration with external approval systems for enterprise deployments.

At 414, the process 400 receives user feedback regarding the generated content and identifies areas for modification or enhancement. For example, the UI and logic tool 204 shown in FIG. 2 may capture user instructions, corrections, content modifications, or new requirements through the chat interface while also enabling direct manipulation through visual editing tools. Users may provide feedback ranging from high-level strategic adjustments to specific textual or visual modifications. In some implementations, the ICEGEN may also receive feedback through the visual editing tool where users can make direct edits to layout context and styles while receiving contextual AI suggestions and live preview updates. Some implementations may include structured feedback collection through forms, voice-based feedback processing, or automated feedback generation based on user interaction patterns.

At 416, the process 400 determines user satisfaction with the generated content to decide whether additional refinement is required. For example, the orchestration tool 212 shown in FIG. 2 may evaluate explicit user confirmation signals, implicit satisfaction indicators from user behavior, or direct approval statements to determine whether the iterative refinement process should continue. If the user is satisfied, the process 400 proceeds to 418 to finalize and save the template or campaign. If the user is not satisfied, the process 400 proceeds to 422 to update the template or campaign based on feedback.

This decision point, at 416, enables the ICEGEN to maintain quality standards while optimizing user experience through efficient iteration cycles. In some implementations, the satisfaction assessment may include automated quality checks, performance prediction validation, or brand compliance verification. Some implementations may include machine learning-based satisfaction prediction, multi-stakeholder approval workflows, or automated satisfaction scoring based on content quality metrics.

At 418, the process 400 finalizes and saves the template or campaign when user satisfaction is achieved. For example, the data management tool 216 shown in FIG. 2 may persist the completed email templates, campaign strategies, and associated metadata in structured storage systems for future use and reference. The finalization process includes validation of all content elements, compilation of campaign logic, and preparation for delivery workflows. In some implementations, finalization may include automated quality assurance checks, performance optimization, and integration preparation for email delivery systems.

At 420, the process 400 recommends send times through intelligent scheduling optimization to maximize campaign effectiveness. For example, the smart scheduling optimizer agent 314 shown in FIG. 3 may analyze historical engagement data, recipient behavior patterns, and contextual factors to determine optimal delivery timing for different audience segments. The optimizer refines schedules proposed during strategy development, providing specific recommendations for day of week, time of day, and sequence timing to maximize dispatch effectiveness.

After 420, the campaign is ready for delivery, which includes technical steps such as merging recipient data with finalized templates, queuing messages in the email delivery system 234 shown in FIG. 2, configuring SMTP relay connections or third-party delivery service integrations, and initiating automated transmission sequences according to the optimized scheduling parameters. In some implementations, delivery readiness may include final validation checks, deliverability testing, and monitoring system preparation. Some implementations may include real-time send-time optimization, individual recipient preference learning, or integration with external calendar systems for contextual scheduling decisions.

At 422, the process 400 updates template or campaign based on user feedback when satisfaction has not been achieved. For example, the AI management tool 214 shown in FIG. 2 may coordinate specialized agents to interpret user feedback and modify existing email templates or campaign structures accordingly. The AI-driven adaptation process may include refining copy and tone, adjusting layout and design elements, modifying campaign logic such as email sequences or automation triggers, generating multilingual content variations, incorporating media suggestions, running accessibility and readability checks, assessing performance predictions, and flagging potential brand compliance issues. In some implementations, the update process may involve selective re-invocation of only the affected agents to preserve unmodified portions and reduce computational overhead.

At 424, the process 400 re-renders updated content to the user for continued review and feedback. For example, the visual editing tool 206 shown in FIG. 2 may display the modified templates and campaign visualizations with clear indication of changes made in response to user feedback. The re-rendering process ensures that users can evaluate the effectiveness of modifications and provide additional guidance if needed. The updated output is presented through both conversational summaries and interactive visual previews that enable further refinement.

From 424, the process 400 returns to 414 to receive additional user feedback, creating an iterative refinement loop that continues until user satisfaction is achieved at 416. In some implementations, re-rendering may include side-by-side comparisons with previous versions, detailed change logs, or automated highlighting of modified elements. Some implementations may include real-time collaborative editing capabilities, automated change tracking systems, or integration with external review and approval workflows that enable team-based content development and refinement processes.

FIG. 5 through FIG. 17 illustrate examples of prompts that tools or agents of the ICEGEN may use to cause LLMs to perform specialized content generation and analysis tasks within the email marketing workflow. Each prompt represents a structured set of instructions that directs an LLM to perform specific functions such as copywriting, brand integration, accessibility checking, or performance prediction. The prompts typically include role definitions that establish the agent's function, objective statements that specify desired outcomes, input parameters that provide contextual information, behavior rules that govern processing approaches, and output format specifications that ensure consistent, machine-readable results. This standardized prompt structure enables the AI management tool 300 to coordinate multiple specialized agents while maintaining quality and consistency across diverse content generation tasks.

Some of the prompts may include instructions that would cause other agents to be called through a coordinated tool-calling mechanism. For example, a prompt might instruct an orchestration agent to "activate the brand integration agent to apply corporate styling" or direct a content generation agent to "invoke the accessibility checker agent upon completion." In some implementations, this may function through a multi-step process where an agent processes its prompt and determines that additional specialized capabilities are required to complete the task. The agent may then generate structured requests or function calls that specify which additional agents should be invoked and what parameters should be provided to them. The AI management tool 300 interprets these agent-generated requests and coordinates the execution of downstream agents thereby creating an iterative workflow where agent outputs can trigger coordinated execution across multiple specialized components until the complete content generation objective is achieved through collaborative agent interaction.

FIG. 5 illustrates an example of a prompt 500 that may be used by or with the UI and logic tool 204 of FIG. 2. The prompt 500 configures an LLM to function as a dialogue manager agent responsible for collecting and clarifying all relevant requirements from users who want to create email marketing campaigns. The prompt 500 directs the agent to engage in multi-turn conversations to gather comprehensive campaign details including objectives, target audience descriptions, key messaging, desired tone, and specific content requirements. The prompt 500 establishes behavior rules that ensure systematic information gathering through focused questioning, periodic summarization of collected details, and clarification of unclear inputs.

The UI and logic tool 204 is specifically instructed not to generate email templates but to focus exclusively on requirement elicitation and validation. The prompt 500 includes termination criteria that specify when the conversation should be marked completed, typically when users provide explicit confirmation that all campaign requirements have been shared and they are ready for template generation to begin. The structured output format ensures that collected requirements are organized in a machine-readable JavaScript Object Notation (JSON) format that can be processed by downstream agents in the content generation workflow.

FIGS. 6A-6B illustrate an example of a prompt 600 that may be used by or with the campaign modeling agent 318 of FIG. 3. The prompt 600 configures an LLM to function as an AI email marketing strategy builder agent that translates high-level user goals and website context into complete, multi-step email marketing strategies. The prompt 600 represents a composite AI system composed of several specialized modules that work in concert to create actionable email marketing campaigns from broad strategic objectives.

The prompt 600 directs the campaign modeling agent 318 to process a user's campaign objective and website Uniform Resource Locator (URL) through a structured workflow that includes website data analysis, campaign sequencing, and content scaffolding. The campaign modeling agent 318 is instructed to activate a website data analysis & synthesis engine sub-module that performs semantic analysis of the provided website to extract key business information including primary products and services, brand voice characteristics, recurring themes, and calls-to-action. This engine synthesizes the extracted website data with the user's stated goal to create a rich contextual foundation for the strategic planning process.

The prompt 600 establishes a campaign sequencing & logic module that serves as the strategic component utilizing a knowledge base of proven marketing funnels and campaign archetypes such as onboarding, nurturing, re-engagement, and promotional campaigns. Based on the user's goal and synthesized data, this module selects the most appropriate campaign archetype, maps out logical email sequences such as welcome followed by feature introduction followed by social proof, and defines automation triggers and delays between each step including time-based delays and user action triggers. For each step in the campaign sequence, the agent generates structured content scaffolds through a content scaffolding agent that creates structured briefs outlining the specific purpose of each email, key messages to convey, primary calls to action, and suggestions for tone and content derived from website analysis.

FIG. 6C illustrates an example of a prompt 650 that may be used by or with the campaign modeling agent 318 of FIG. 3. The prompt 650 configures an LLM to function as an AI agent management service responsible for receiving structured email campaign requirements and orchestrating specialized AI agents to generate, refine, and optimize email templates. The prompt 650 directs the campaign modeling agent 318 to translate confirmed campaign requirements into sequences of tasks for specialized agents including persona modeling, brand integration, design, copywriting, media generation, multilingual translation, accessibility checking, readability analysis, and predictive performance assessment.

The prompt 650 establishes responsibilities for deconstructing overall email template creation goals into sub-tasks for specialized agents, determining logical execution order such as persona and brand analysis before copywriting and design, and passing necessary data between agents such as persona profiles to copywriting agents and brand guidelines to design agents. The campaign modeling agent 318 is instructed to aggregate outputs from various agents to build evolving email templates, manage iterative refinement loops based on user feedback by re-invoking agents as needed, and trigger final optimization checks including predictive performance and scheduling analysis before marking templates as ready for delivery. The output format specifies a conceptual structure for tracking session states, action plans with agent status monitoring, and template completion indicators that enable coordinated multi-agent workflow management.

FIG. 7 illustrates an example of a prompt 700 that may be used by or with the persona modeling agent 302 UI of FIG. 3. The prompt 700 enables the persona modeling agent 302 to transform natural language descriptions of target audiences into structured, actionable persona profiles that other AI agents can utilize for content personalization. The prompt 700 instructs the persona modeling agent 302 to analyze user-provided target audience descriptions and campaign objectives to extract key demographic and psychographic attributes. The persona modeling agent 302 identifies characteristics such as age ranges, occupations, industries, interests, pain points, motivations, and communication preferences that are relevant to email engagement and campaign success.

When multiple distinct audience segments are detected within the user's description, the prompt 700 guides the persona modeling agent 302 to create separate persona profiles for each segment. The structured output format ensures that demographic information (age, location, occupation) and psychographic data (interests, values, pain points, motivations) are organized in a standardized JSON format that downstream agents can easily parse and utilize. The persona profiles generated by prompt 700 serve as the foundation for content personalization, enabling other AI agents in the system to tailor email messaging, tone, and design elements to maximize relevance and impact with the intended recipients FIG. 8 illustrates an example of a prompt 800 that may be used by or with the brand integration agent 312 UI of FIG. 3. The prompt 800 enables the brand integration agent 312 to ensure that email templates consistently reflect the user's established brand identity by automatically applying predefined brand guidelines to the email structure. The prompt 800 instructs the brand integration agent 312 to analyze email HTML drafts and incorporate brand elements such as logos, color palettes, and typography according to the user's brand guidelines. The brand integration agent 312 identifies appropriate locations within the HTML structure to insert brand logos, applies primary and secondary brand colors to relevant elements like buttons and headings, and sets specified font families for text elements while ensuring email client compatibility.

The prompt 800 guides the brand integration agent 312 to prioritize accessibility considerations, such as ensuring sufficient contrast when applying brand colors to text backgrounds. When brand voice keywords are provided, the brand integration agent 312 performs visual consistency checks to ensure the integration aligns with the intended brand tone. The structured output format provides an updated HTML template with integrated brand elements, along with a detailed integration summary and any issues or recommendations. This ensures visual cohesion and brand recognition across all email communications while maintaining design best practices.

FIG. 9 illustrates an example of a prompt 900 that may be used by or with the email design and layout agent 316 UI of FIG. 3. The prompt 900 enables the email design and layout agent 316 to create the visual and structural blueprint of email templates by generating optimal HTML structures and layouts based on campaign objectives, content requirements, target personas, and brand aesthetics. The prompt 900 instructs the email design and layout agent 316 to analyze campaign objectives, key content elements, persona profiles, and brand guidelines to determine the most effective layout pattern and visual hierarchy. The email design and layout agent 316 prioritizes mobile-first, responsive design principles while selecting appropriate email layout patterns such as single column, inverted pyramid, or zig-zag configurations based on the content type and campaign goals.

The prompt 900 guides the email design and layout agent 316 to incorporate HTML and inline cascading style sheet (CSS) best practices for email client compatibility, while creating placeholders for content that will be populated by other agents. The email design and layout agent 316 considers persona preferences when making layout decisions, ensuring that professional audiences receive cleaner, more spacious designs while other segments may benefit from more vibrant or dynamic layouts. The structured output provides a responsive HTML structure with placeholders and inline CSS, along with layout rationale and suggested content sections. This ensures that the resulting email template is visually appealing, user-friendly, and effective in guiding recipients toward the intended call to action across various devices and email clients.

FIG. 10 illustrates an example of a prompt 1000 that may be used by or with the copywriting and content agent 304 UI of FIG. 3. The prompt 1000 enables the copywriting and content agent 304 to craft compelling textual elements for email campaigns by leveraging language generation capabilities to produce persuasive subject lines, preheaders, body copy, and calls to action that align with specific persona profiles and campaign objectives. The prompt 1000 instructs the copywriting and content agent 304 to analyze campaign goals, persona characteristics, key messages, desired tone, and brand voice keywords to generate text that resonates with target recipients. The copywriting and content agent 304 tailors language style and complexity to match the provided persona profile while ensuring the copy directly supports campaign objectives and incorporates user-specified selling points.

The prompt 1000 guides the copywriting and content agent 304 to apply specific writing strategies for different email sections, such as creating curiosity and urgency in subject lines for high open rates, focusing on benefits and clarity in body copy, and using strong action verbs in calls to action. When beneficial for optimization, the copywriting and content agent 304 can generate multiple variations for A/B testing purposes. The structured output provides generated text for the specified section, optional alternative variations, and detailed rationale explaining how the copy aligns with persona interests and campaign tone. This ensures that all textual content is engaging, clear, and strategically crafted to drive desired recipient actions while maintaining consistency with the established brand voice.

FIG. 11 illustrates an example of a prompt 1100 that may be used by or with the media suggestion and generation agent 308 UI of FIG. 3. The prompt 1100 enables the media suggestion and generation agent 308 to provide relevant visual assets that enhance email campaigns by suggesting suitable stock images, icons, or banners, or by generating custom visuals that align with the campaign's specific intent and brand style. The prompt 1100 instructs the media suggestion and generation agent 308 to analyze email themes, campaign objectives, and brand style notes to identify contextually appropriate visual content. The media suggestion and generation agent 308 operates in two distinct modes: suggesting high-quality stock media from simulated libraries with clear licensing, or generating custom visuals that align with specified brand aesthetics such as color palettes and design styles.

The prompt 1100 guides the media suggestion and generation agent 308 to prioritize visual quality and relevance while considering specific user requests for particular types of imagery or iconography. When generating custom content, the media suggestion and generation agent 308 ensures that visuals maintain brand consistency and appropriateness for the intended audience and campaign goals. The structured output provides multiple media options with source information, preview data, suggested alt text for accessibility, and relevance scores to help users select the most appropriate visuals. This streamlines the process of finding or creating media assets, making email campaigns more visually engaging while maintaining alignment with brand identity and campaign objectives.

FIG. 12 illustrates an example of a prompt 1200 that may be used by or with the multilingual and translation agent 306 UI of FIG. 3. The prompt 1200 enables the multilingual and translation agent 306 to create and adapt email campaigns for global audiences by accurately translating email content into multiple target languages while preserving the original message's meaning, tone, and cultural nuance for effective localization. The prompt 1200 instructs the multilingual and translation agent 306 to analyze structured email content elements such as subject lines, body paragraphs, and call-to-action text, along with source language specifications and target language requirements. The multilingual and translation agent 306 utilizes advanced neural machine translation models while applying cultural adaptation guidelines to ensure that translations maintain the original tone and style notes across different locales.

The prompt 1200 guides the multilingual and translation agent 306 to focus on localization rather than literal translation, incorporating cultural nuances and using provided glossaries for consistent brand terminology. When highly idiomatic content cannot be directly translated, the multilingual and translation agent 306 suggests culturally equivalent alternatives or flags potential issues for review. The structured output provides translations for each target language with corresponding translated content elements and optional translation notes explaining cultural adaptations. This ensures that email campaigns resonate effectively with diverse recipient groups while maintaining brand consistency and cultural appropriateness across multiple markets and languages.

FIG. 13 illustrates an example of a prompt 1300 that may be used by or with the accessibility checker agent 324 UI of FIG. 3. The prompt 1300 enables the accessibility checker agent 324 to ensure that email templates are usable by people with a wide range of disabilities by evaluating HTML structure and content against Web Content Accessibility Guidelines (WCAG) and related best practices to identify potential accessibility barriers. The prompt 1300 instructs the accessibility checker agent 324 to analyze email HTML content for common accessibility issues including missing or inadequate alt text for images, insufficient color contrast between text and backgrounds, improper use of semantic HTML elements, unclear link text, and keyboard accessibility concerns. The accessibility checker agent 324 evaluates compliance against specified WCAG levels while checking for proper use of ARIA attributes and language attribute declarations.

The prompt 1300 guides the accessibility checker agent 324 to provide specific code snippets and clear remediation instructions for identified issues, referencing relevant WCAG success criteria for each recommendation. The accessibility checker agent 324 categorizes issues by severity level to help prioritize fixes that will have the greatest impact on accessibility compliance. The structured output provides a comprehensive accessibility report including overall compliance estimates, detailed issue descriptions with HTML context and specific recommendations, and a list of accessibility checks that passed. This ensures that email templates meet accessibility standards and can be effectively used by recipients with disabilities, helping organizations maintain inclusive communication practices.

FIG. 14 illustrates an example of a prompt 1400 that may be used by or with the readability analyzer agent 322 of FIG. 3. The prompt 1400 configures an LLM to function as a Readability & Complexity Analyzer AI Agent that evaluates the textual content of emails to assess comprehension difficulty and readability for target audiences. The readability analyzer agent 322 uses established linguistic metrics to score readability and identify overly complex sentences, jargon, or vocabulary that might confuse recipients.

The prompt 1400 directs the readability analyzer agent 322 to calculate standard readability scores including Flesch-Kincaid Grade Level and Flesch Reading Ease measurements to determine the educational level required to understand the email content. The readability analyzer agent 322 is instructed to identify complex sentences, technical jargon, or overly long words that might hinder comprehension for general audiences unless a technical audience is specifically indicated. The prompt 1400 establishes behavior rules for providing overall readability assessments and offering specific examples from the text that could be simplified along with alternative phrasing suggestions.

The prompt 1400 enables the readability analyzer agent 322 to compare readability scores against target audience reading level preferences when provided, ensuring that email content matches the comprehension capabilities of intended recipients. The output format specifies a structured JSON response that includes calculated readability metrics, overall assessment summaries, detailed areas for improvement with specific text examples and simplification suggestions, and positive aspects of the content's readability. This comprehensive analysis helps users ensure their email copy is easily understandable by their target audience, thereby improving engagement and message clarity through data-driven content optimization recommendations.

FIG. 15 illustrates an example of a prompt 1500 that may be used by or with the predictive performance agent 310 of FIG. 3. The prompt 1500 configures an LLM to function as a Predictive Content Performance Engine that leverages machine learning models and historical data to forecast the potential effectiveness of email templates before transmission. The predictive performance agent 310 estimates key engagement indicators such as open rates, click-through rates, and potential spam filter risk to enable data-informed optimization decisions.

The prompt 1500 directs the predictive performance agent 310 to process structured email template features including subject line characteristics, content metrics, visual elements, readability scores, and sentiment analysis to generate performance predictions. The predictive performance agent 310 is instructed to select appropriate predictive models based on available inputs including target audience segment profiles and historical campaign data when provided. The prompt 1500 establishes behavior rules for predicting specific metrics including estimated open rates, click-through rates, and spam flag risk assessments while providing confidence levels for the predictions.

The prompt 1500 enables the predictive performance agent 310 to identify key influencing factors that positively or negatively impact predicted performance, such as subject line length effects on open rates or call-to-action prominence effects on click-through rates. The output format specifies a structured JSON response that includes predicted performance metrics with confidence indicators, detailed analysis of key influencing factors with their specific impacts on different engagement metrics, and actionable recommendations for improvement such as A/B testing suggestions or content optimization strategies. This comprehensive performance forecasting enables users to make data-informed adjustments to email content or design elements to optimize campaign outcomes before delivery.

FIG. 16 illustrates an example of a prompt 1600 that may be used by or with the deviation detection agent 320 of FIG. 3. The prompt 1600 configures an LLM to function as a Deviation Detection Engine that acts as a brand consistency guardian by comparing newly generated or user-modified email content against established brand voice samples, style guides, and preferred terminology. The deviation detection agent 320 detects significant deviations in tone, style, or word usage to help maintain cohesive brand identity across all communications.

The prompt 1600 directs the deviation detection agent 320 to analyze current email content for linguistic features including vocabulary, sentence structure, sentiment, and tone indicators, then compare these characteristics against approved brand voice samples using similarity metrics or stylistic analysis models. The deviation detection agent 320 is instructed to check adherence to brand style guide rules regarding preferred terminology, forbidden phrases, tone attributes, and formatting requirements. The prompt 1600 establishes behavior rules for identifying specific words, phrases, or stylistic elements that deviate significantly from established brand identity standards.

The prompt 1600 enables the deviation detection agent 320 to provide comprehensive reports of detected deviations with specific location context, clear issue descriptions, and actionable correction suggestions for maintaining brand consistency. The output format specifies a structured JSON response that includes an overall brand alignment score, detailed deviation analysis categorized by type such as terminology misuse, tone conflicts, or forbidden phrase usage, and contextual suggestions for corrections. This systematic brand compliance monitoring helps users maintain consistent brand voice and style across email communications by flagging potential inconsistencies and providing specific guidance for alignment with established brand guidelines and approved communication standards.

FIG. 17 illustrates an example of a prompt 1700 that may be used by or with the smart scheduling optimizer agent 314 of FIG. 3. The prompt 1700 configures an LLM to function as a Smart Scheduling Optimizer AI Agent that helps users determine the most effective times to send email campaigns by analyzing historical engagement data for specific audience segments. The smart scheduling optimizer agent 314 considers factors like time zones and past interaction patterns to recommend optimal dispatch times that maximize the likelihood of emails being opened and engaged with.

The prompt 1700 directs the smart scheduling optimizer agent 314 to analyze recipient data and historical engagement patterns including target audience segment identifiers, campaign types, user-preferred send window constraints, and historical engagement data access with timestamps and time zone information. The smart scheduling optimizer agent 314 is instructed to optimize for recipient local times when time zone data is available, identify peak open and click times for given segments, and consider day-of-week and time-of-day patterns while factoring in campaign type influences such as urgent announcements versus regular newsletters.

The prompt 1700 establishes behavior rules for the smart scheduling optimizer agent 314 to respect user-preferred send window constraints, fall back to general best practices when insufficient segment-specific data exists, and suggest either single optimal times or multiple high-potential windows depending on segment characteristics. The output format specifies structured JSON recommendations that include segment-specific send times in UTC format, local time descriptions, confidence scores, detailed rationales explaining historical engagement patterns, and notes on constraint considerations. This comprehensive scheduling optimization enables users to improve overall campaign performance through data-driven timing decisions that account for audience behavior patterns and contextual factors.

Figure 18:
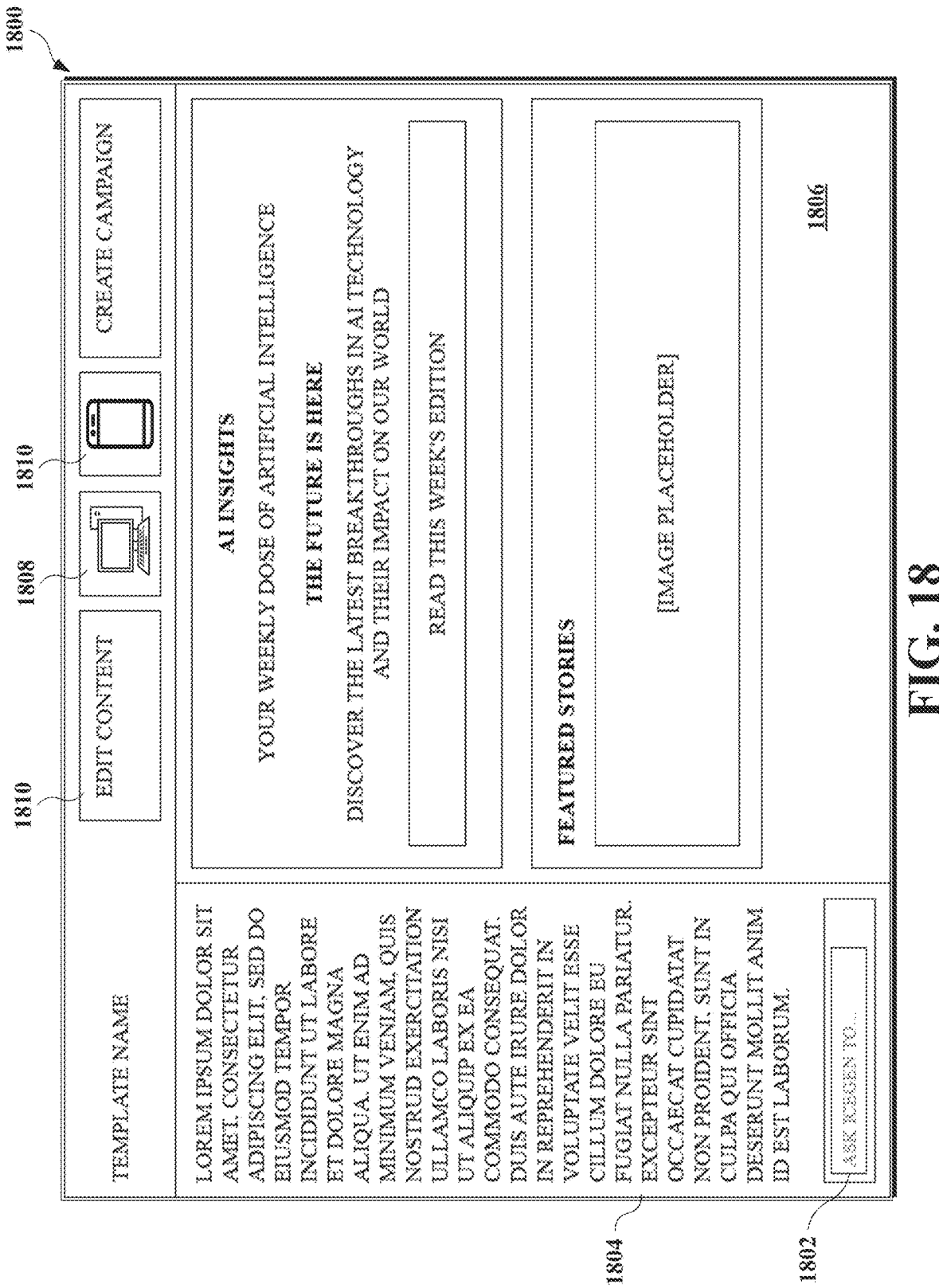
FIG. 18 illustrates an example of a user interface that may be generated by the Intelligent Campaign Engine Generation and displayed at a user device.

FIG. 18 illustrates an example of a user interface 1800 that may be generated by the ICEGEN 202 and displayed at the user device 230 of FIG. 2. Via the user interface 1800, a user of the user device can interact with the ICEGEN 202 to cause the ICEGEN 202 to generate email marketing campaigns through guided multi-agent orchestration in response to natural language input and subsequent refinements.

A field 1802 enables the user to enter freeform, natural language instructions or feature requests describing the desired functionality of the email template. Via the field 1802, the user can provide conversational instructions for template modifications or campaign requirements. A conversation panel 1804 displays the running dialogue between the user and a conversation agent of the ICEGEN 202, reflecting submitted instructions and corresponding responses, including confirmations of applied updates or clarifications. A preview pane 1806 displays a live, rendered version of the generated email template in its current state, enabling the user to visually inspect and interact with the template prior to delivery. The preview pane 1806 enables users to see how their email template will appear to recipients before finalizing the campaign.

A control 1808 enables the user to view the template in desktop view, providing a preview of how the email will render on desktop email clients and larger screen formats. A control 1810 enables the user to view the template in mobile device view, enabling users to preview how the email template will appear on smartphones and tablets with smaller screen sizes and different aspect ratios. These responsive preview controls ensure that users can optimize their email templates for different viewing contexts and device types. A control 1810 enables the user to directly edit the contents of the template through an interactive editing interface. The control 1810 may trigger the visual editing tool 206 described in FIG. 2, enabling users to make real-time modifications to text, images, colors, and layout elements within the template structure.

To further describe some implementations in greater detail, reference is next made to examples of techniques which may be performed by or using guided multi-agent orchestration for automated email campaign generation and delivery, such as those described in this disclosure. FIG. 19 is a flowchart of an example of a technique 1900 for guided multi-agent orchestration for automated email marketing campaign generation and delivery from natural language input. The technique 1900 can be executed using computing devices, such as the systems, hardware, and software described with respect to FIGS. 1-18. The technique 1900 can be performed, for example, by executing a machine-readable program or other computer-executable instructions, such as routines, instructions, programs, or other code. The steps, or operations, of the technique 1900, or another technique, method, process, or algorithm described in connection with the implementations disclosed herein can be implemented directly in hardware, firmware, software executed by hardware, circuitry, or a combination thereof.

For simplicity of explanation, the technique 1900 is depicted and described herein as a series of steps or operations. However, the steps or operations of the technique 1900 can occur in various orders and/or concurrently. Additionally, other steps or operations not presented and described herein may be used. Furthermore, not all illustrated steps or operations may be required to implement a technique in accordance with the disclosed subject matter.

At 1902, the technique 1900 receives, via a conversational interface, campaign-requirement data describing at least an objective (e.g., a marketing objective), an audience description, and brand preferences. For example, the ICEGEN 202 shown in FIG. 2 may receive natural language descriptions of email campaign objectives through the UI and logic tool 204. In some implementations, the conversational interface may receive natural language descriptions of campaign goals through a chat-based dialogue manager, and the campaign-requirement data may include multilingual content requirements processed by a translation agent. The conversational interface enables users to specify content requirements through chat-based interactions rather than complex configuration forms, enabling dynamic dialogue between users and the system to refine campaign requirements. In some implementations, users may input requests through web browsers, mobile applications, or dedicated desktop clients, with the interface providing real-time feedback regarding the status of content generation processes.

At 1904, the technique 1900 parses the campaign-requirement data into a structured campaign object. For example, the orchestration tool 212 shown in FIG. 2 may analyze the received campaign requirements and brand information to identify relevant brand settings and campaign parameters. In some implementations, parsing the campaign-requirement data may include extracting structured data elements including target audience demographics, campaign objectives, and key messaging from natural language input.

The technique 1900 evaluates user-supplied requirements, extracts structured data elements from the natural language input, consults dependency graphs, and assembles execution plans that govern downstream agent invocation. The processing may include validation of input parameters, extraction of audience demographics and campaign objectives from conversational text, and preparation of contextual information for specialized AI agents.

At 1906, the technique 1900 orchestrates execution of a plurality of specialized agents based on the structured campaign object. For example, the AI management tool 214 shown in FIG. 2 may coordinate specialized agents including copywriting, design, and brand integration agents to create individual email templates based on precise user specifications. In some implementations, orchestrating execution of the plurality of specialized agents may include determining a logical execution order where persona modeling and brand integration occur before copywriting and design, and passing persona profiles from the persona modeling agent to downstream agents. The technique 1900 may use a set of specialized AI agents directly to generate the initial version of the email template, which may involve parallel processing across multiple agents to optimize generation speed and quality. The orchestration process enables dynamic agent allocation, context sharing, and result aggregation to produce cohesive email marketing assets.

At 1908, the plurality of specialized agents generate an email template that is branded according to the brand preferences and tailored to the audience description. For example, one or more of the specialized agents managed by the AI management tool 300 shown in FIG. 3 may collaborate to draft copy, select appropriate layouts, integrate brand elements, and suggest visuals via the AI media suggestion and generation engine. The plurality of specialized agents may include, amongst others, a persona modeling agent that analyzes the audience description to create structured persona profiles, and a copywriting agent that generates email content tailored to the structured persona profiles.

The generation process may include applying brand elements including logos and color palettes through a brand integration agent, and suggesting visual assets through a media suggestion and generation agent. Additionally, generating the email template may include creating responsive HTML structure with inline CSS optimized for email client compatibility across multiple devices. The agents work collaboratively to ensure that the generated template maintains visual cohesion and brand recognition across all communications while maintaining design best practices.

At 1910, the technique 1900 validates the email template for at least readability, accessibility, and compliance with stored brand guidelines. For example, the accessibility checker agent 324 and readability analyzer agent 322 shown in FIG. 3 may assess the template against WCAG and ADA standards. In some implementations, validating the email template may include checking color contrast ratios between text and background elements using an accessibility checker agent, and calculating readability scores using linguistic metrics including Flesch-Kincaid grade level measurements.

The validation process may also include evaluating compliance with WCAG standards including alt text for images and semantic HTML structure. Validation modules assess readability, accessibility, and brand adherence to ensure that the template meets established quality standards. Some implementations may include automated remediation suggestions, compliance reporting for regulated industries, or integration with assistive technology testing tools.

At 1912, the technique 1900 dispatches the validated email template to a set of recipient addresses according to a campaign schedule. For example, the email dispatch tool 215 shown in FIG. 2 may retrieve the finalized template and any associated campaign logic and contact list from the data management tool 216. Dispatching the validated email template may include integrating with email delivery infrastructure and logging delivery status and engagement metrics for closed-loop retraining of the specialized agents. The dispatch process includes technical steps such as merging recipient data with finalized templates, queuing messages in the email delivery system 234, configuring SMTP relay connections or third-party delivery service integrations, and initiating automated transmission sequences according to optimized scheduling parameters. Some implementations may include real-time send-time optimization, individual recipient preference learning, or integration with external calendar systems for contextual scheduling decisions.

The technique 1900 can include analyzing the campaign-requirement data to determine whether to generate a single email template or propose a complete multi-step campaign strategy. The campaign modeling agent 318 may analyze the scope and specificity of user requirements to classify requests as either broad strategic goals or specific email template requests. If the user expresses a broad goal such as "onboard new customers," the technique 1900 may proceed to create campaign strategy through the AI email marketing strategy builder agent. This agent analyzes the objective and the user's business context to autonomously propose a complete marketing strategy, including campaign topics, a sequence of emails, and a sending schedule.

The technique 1900 can include ingesting website data from a user-provided URL to extract business information including products, services, and brand voice characteristics. For example, an agent may perform semantic analysis of the provided website to extract key business information including primary products and services, brand voice characteristics, recurring themes, and calls-to-action. The agent synthesizes the extracted website data with the user's stated goal to create a rich contextual foundation for the strategic planning process. The technique 1900 may collect images for two purposes: to understand the website's content, especially schemes or explanations, and to reuse them directly in email templates for events, blog posts, or advertisements. Some implementations may include advanced image analysis capabilities, automated content categorization, or integration with content management systems.

The technique 1900 can include forecasting engagement metrics including open rates and click-through rates using a predictive performance engine based on historical campaign data. For example, the predictive performance agent 310 may analyze factors including subject line characteristics, content structure, sending patterns, and recipient behavior to generate performance predictions. To illustrate, the predictive performance agent 310 may predict that emails sent on Tuesday mornings with subject lines under 50 characters will achieve 25% higher open rates for a specific audience segment. The predictive analysis may include real-time performance optimization, integration with external analytics platforms, or predictive models specialized for different industry verticals. Implementations may include machine learning-based performance forecasting, A/B testing recommendations, or dynamic content optimization based on predicted outcomes.

The technique 1900 can include detecting deviations from established brand voice by comparing generated content against stored brand writing samples using a deviation detection agent. For example, the deviation detection agent 320 may compare AI-generated or user-modified content against stored brand writing samples and style guides to flag deviations in tone, style, or terminology. The deviation detection agent 320 may flag informal language in corporate communications or identify inconsistent product terminology across campaign materials. In some implementations, the deviation detection may provide real-time feedback during content creation, suggesting corrections to maintain brand consistency. Some implementations may include machine learning-based style analysis, integration with content governance platforms, or automated correction suggestions to ensure consistent brand voice and style across all communications.

The technique 1900 can include optimizing send times for the campaign schedule using a smart scheduling optimizer agent that analyzes historical engagement patterns and recipient time zones. For example, the smart scheduling optimizer agent 314 may analyze factors including recipient activity patterns, industry-specific engagement trends, and seasonal variations to determine optimal delivery timing. The agent might recommend sending business-to-business (B2B) newsletters on Tuesday mornings at 10 AM local time while suggesting consumer promotional emails for weekend afternoons. The optimization may include real-time send-time optimization, integration with external calendar systems, or predictive scheduling based on individual recipient preferences. The optimizer refines schedules proposed during strategy development, providing specific recommendations for day of week, time of day, and sequence timing to maximize dispatch effectiveness across different audience segments and campaign types.

Unless expressly stated, or otherwise clear from context, the terminology "computer," and variations or wordforms thereof, such as "computing device," "computing machine," "computing and communications device," and "computing unit," indicates a "computing device," such as the computing device 100 shown in FIG. 1, that implements, executes, or performs one or more aspects of the methods and techniques described herein, or is represented by data stored, processed, used, or communicated in accordance with the implementation, execution, or performance of one or more aspects of the methods and techniques described herein.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

Unless expressly stated, or otherwise clear from context, the terminology "instructions," and variations or wordforms thereof, such as "code," "commands," or "directions," includes an expression, or expressions, of an aspect, or aspects, of the methods and techniques described herein, realized in hardware, software, or a combination thereof, executed, processed, or performed, by a processor, or processors, as described herein, to implement the respective aspect, or aspects, of the methods and techniques described herein. Unless expressly stated, or otherwise clear from context, the terminology "program," and variations or wordforms thereof, such as "algorithm," "function," "model," or "procedure," indicates a sequence or series of instructions, which may be iterative, recursive, or both.

Unless expressly stated, or otherwise clear from context, the terminology "communicate," and variations or wordforms thereof, such as "send," "receive," or "exchange," indicates sending, transmitting, or otherwise making available, receiving, obtaining, or otherwise accessing, or a combination thereof, data in a computer accessible form via an electronic data communications medium.

To the extent that the respective aspects, features, or elements of the devices, apparatus, methods, and techniques described or shown herein, are shown or described as a respective sequence, order, configuration, or orientation, thereof, such sequence, order, configuration, or orientation is explanatory and other sequences, orders, configurations, or orientations may be used, which may be include concurrent or parallel performance or execution of one or more aspects or elements thereof, and which may include devices, methods, and techniques, or aspects, elements, or components, thereof, that are not expressly described herein, except as is expressly described herein or as is otherwise clear from context. One or more of the devices, methods, and techniques, or aspects, elements, or components, thereof, described or shown herein may be omitted, or absent, from respective implementations.

The figures, drawings, diagrams, illustrations, and charts shown and described herein express or represent the devices, methods, and techniques, or aspects, elements, or components, thereof, as disclosed herein. The elements, such as blocks and connecting lines, of the figures, drawings, diagrams, illustrations, and charts, shown and described herein, or combinations thereof, may be implemented or realized as respective units, or combinations of units, of hardware, software, or both.

Unless expressly stated, or otherwise clear from context, the terminology "determine," "identify," and "obtain," and variations or wordforms thereof, indicates selecting, ascertaining, computing, looking up, receiving, determining, establishing, obtaining, or otherwise identifying or determining using one or more of the devices and methods shown and described herein. Unless expressly stated, or otherwise clear from context, the terminology "example," and variations or wordforms thereof, such as "implementation" and "implementation," indicates a distinct, tangible, physical realization of one or more aspects, features, or elements of the devices, methods, and techniques described herein. Unless expressly stated, or otherwise clear from context, the examples described herein may be independent or may be combined.

Unless expressly stated, or otherwise clear from context, the terminology "or" is used herein inclusively (inclusive disjunction), rather than exclusively (exclusive disjunction). For example, unless expressly stated, or otherwise clear from context, the phrase "includes A or B" indicates the inclusion of "A," the inclusion of "B," or the inclusion of "A and B." Unless expressly stated, or otherwise clear from context, the terminology "a," or "an," is used herein to express singular or plural form. For example, the phrase "an apparatus" may indicate one apparatus or may indicate multiple apparatuses. Unless expressly stated, or otherwise clear from context, the terminology "including," "comprising," "containing," or "characterized by," is inclusive or open-ended such that some implementations or implementations may be limited to the expressly recited or described aspects or elements, and some implementations or implementations may include elements or aspects that are not expressly recited or described.

As used herein, numeric terminology that expresses quantity (or cardinality), magnitude, position, or order, such as numbers, such as 1 or 20.7, numerals, such as "one" or "one hundred," ordinals, such as "first" or "fourth," multiplicative numbers, such as "once" or "twice," multipliers, such as "double" or "triple," or distributive numbers, such as "singly," used descriptively herein are explanatory and non-limiting, except as is described herein or as is otherwise clear from context. For example, a "second" element may be performed prior to a "first" element, unless expressly stated, or otherwise clear from context.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
receiving, via a conversational interface, campaign-requirement data describing at least an objective, an audience description, and brand preferences;
parsing the campaign-requirement data into a structured campaign object;
orchestrating execution of a plurality of specialized agents based on the structured campaign object,
wherein each of the specialized agents is a specialized software agent and at least some of the specialized software agents execute a structured prompt directed to a large language model (LLM) to perform a designated content-generation task, and
wherein orchestrating the execution of the plurality of specialized agents comprises:
maintaining shared context across the plurality of specialized agents while enforcing global quality constraints;
propagating constraints derived from the structured campaign object to the specialized agents; and
aggregating machine-readable artifacts output by the specialized agents into an evolving campaign object;
generating, by the plurality of specialized agents, an email template that is branded according to the brand preferences and tailored to the audience description;

validating the email template for at least readability, accessibility, and compliance with stored brand guidelines; and
receiving user feedback regarding the email template;
responsive to the user feedback:
analyzing, by one of the specialized agents, the user feedback to identify affected specialized agents;
automatically selectively re-invoking only the identified affected specialized agents of the plurality of specialized agents to modify the email template while preserving unchanged portions of the email template, thereby reducing computational overhead;
dispatching the validated email template to a set of recipient addresses according to a campaign schedule.

2. The method of claim 1, wherein the plurality of specialized agents comprises a persona modeling agent that analyzes the audience description to create structured persona profiles, and a copywriting agent that generates email content tailored to the structured persona profiles.

3. The method of claim 1, wherein validating the email template comprises:
computing, using an accessibility checker agent, color contrast ratios between text and background elements;
comparing the computed ratios against a threshold to identify insufficient color contrast; and
calculating, using a readability analyzer agent, readability scores using Flesch-Kincaid grade level measurements, sentence length assessments, and vocabulary complexity evaluations.

4. The method of claim 1, wherein orchestrating execution of the plurality of specialized agents comprises:
determining a logical execution order where persona modeling performed by a persona modeling agent of the specialized agents and brand integration occur before copywriting and design; and
passing persona profiles from the persona modeling agent to downstream agents of the specialized agents.

5. The method of claim 1, wherein the conversational interface receives natural language descriptions of campaign goals through a chat-based dialogue manager, and the campaign-requirement data includes multilingual content requirements processed by a translation agent.

6. The method of claim 1, wherein generating the email template comprises:
applying brand elements including logos and color palettes through a brand integration agent that inserts brand logos at identified locations within an HTML structure of the email template; and
suggesting visual assets through a media suggestion and generation agent that analyzes textual content of the email template to recommend contextually appropriate visual elements and optimizes image formats for email client compatibility.

7. The method of claim 1, further comprising:
analyzing the campaign-requirement data to determine whether to generate a single email template or propose a complete multi-step campaign strategy.

8. A system, comprising:
a memory subsystem; and
processing circuitry, the processing circuitry configured to execute instructions stored in the memory subsystem to:
receive, via a conversational interface, campaign-requirement data describing at least an objective, an audience description, and brand preferences;
parse the campaign-requirement data into a structured campaign object;

orchestrate execution of a plurality of specialized agents based on the structured campaign object, wherein each of the plurality of the specialized agents is a specialized software agent and at least some of the specialized software agents execute a structured prompt directed to a large language model (LLM) to perform a designated content-generation task, and wherein to orchestrate the execution of the plurality of specialized agents comprises to:

maintain shared context across the plurality of specialized agents while enforcing global quality constraints;

propagate constraints derived from the structured campaign object to the specialized agents; and aggregate machine-readable artifacts output by the specialized agents into an evolving campaign object;

generate, by the plurality of specialized agents, an email template that is branded according to the brand preferences and tailored to the audience description;

validate the email template for at least readability, accessibility, and compliance with stored brand guidelines; and receive user feedback regarding the email template;

responsive to the user feedback, selectively re-invoke only affected agents of the plurality of specialized agents to modify the email template while preserving unchanged portions of the email template, thereby reducing computational overhead;

dispatch the validated email template to a set of recipient addresses according to a campaign schedule.

9. The system of claim 8, the processing circuitry further configured to execute instructions stored in the memory subsystem to:

ingest website data from a user-provided Uniform Resource Locator; and perform semantic analysis of the ingested website data to extract information including products, services, brand voice characteristics, recurring themes, and calls-to-action.

10. The system of claim 8, the processing circuitry further configured to execute instructions stored in the memory subsystem to:

analyze, using a predictive performance agent, subject line characteristics, content structure, and recipient behavior patterns from historical campaign data;

forecast engagement metrics including estimated open rates, click-through rates, and spam flag risk assessments; and generate a structured output comprising the forecasted engagement metrics with associated confidence indicators.

11. The system of claim 8, the processing circuitry further configured to execute instructions stored in the memory subsystem to:

analyze, using a deviation detection agent, generated content for linguistic features including vocabulary, sentence structure, sentiment, and tone indicators;

compare the analyzed linguistic features against stored brand voice samples using similarity metrics;

compute a brand alignment score based on the comparing; and categorize detected deviations by type including terminology misuse, tone conflicts, and forbidden phrase usage.

12. The system of claim 8, the processing circuitry further configured to execute instructions stored in the memory subsystem to:

analyze, using a smart scheduling optimizer agent, historical engagement patterns including day-of-week patterns and time-of-day patterns for recipient segments;

identify peak open times and peak click times for each recipient segment based on the analyzing; and generate segment-specific send time recommendations in Coordinated Universal Time (UTC) format with associated confidence scores.

13. The system of claim 8, wherein, to parse the campaign-requirement data, the processing circuitry configured to execute instructions stored in the memory subsystem to:

extract structured data elements including target audience demographics, campaign objectives, and key messaging from natural language input.

14. The system of claim 8, wherein, to generate the email template, the processing circuitry configured to execute instructions stored in the memory subsystem to:

generate, using an email design and layout agent, a responsive Hypertext Markup Language (HTML) structure with inline Cascading Style Sheets (CSS) that renders appropriately across different email clients, devices, and screen sizes; and apply mobile-first responsive design principles including single-column layouts for mobile device optimization.

15. The system of claim 8, wherein, to validate the email template, the processing circuitry configured to execute instructions stored in the memory subsystem to:

compute, using an accessibility checker agent, a color contrast ratio between text elements and background elements of the email template;

compare the computed color contrast ratio against a Web Content Accessibility Guidelines (WCAG) contrast threshold;

detect, in the email template, image elements lacking alternative text attributes; and generate an accessibility compliance score based at least on the comparing and the detecting.

16. One or more non-transitory computer readable media storing instructions operable to cause one or more processors to perform operations comprising:

receiving, via a conversational interface, campaign-requirement data describing at least an objective, an audience description, and brand preferences;

parsing the campaign-requirement data into a structured campaign object;

orchestrating execution of a plurality of specialized agents based on the structured campaign object, wherein each of the specialized agents is a specialized software agent and at least some of the specialized software agents execute a structured prompt directed to a large language model (LLM) to perform a designated content-generation task, and wherein to orchestrate the execution of the plurality of specialized agents comprises to:

maintain shared context across the plurality of specialized agents while enforcing global quality constraints;

propagate constraints derived from the structured campaign object to the specialized agents; and aggregate machine-readable artifacts output by the specialized agents into an evolving campaign object;

generating, by the plurality of specialized agents, an email template that is branded according to the brand preferences and tailored to the audience description;

validating the email template for at least readability, accessibility, and compliance with stored brand guidelines; and receiving user feedback regarding the email template;

responsive to the user feedback, selectively re-invoking only affected agents of the plurality of specialized agents to modify the email template while preserving unchanged portions of the email template, thereby reducing computational overhead; and dispatching the validated email template to a set of recipient addresses according tto a campaign schedule.

17. The one or more non-transitory computer readable media of claim 16, wherein dispatching the validated email template comprises:

merging recipient-specific data including names, preferences, and segmentation criteria into template placeholders of the validated email template;

transmitting the merged email template via email delivery infrastructure;

logging delivery status and engagement metrics including opens, clicks, and bounces; and using the logged engagement metrics for closed-loop retraining of the specialized agents.

18. The one or more non-transitory computer readable media of claim 16, wherein the plurality of specialized agents comprises at least one of a persona modeling agent that analyzes the audience description to create structured persona profiles, and a copywriting agent that generates email content tailored to the structured persona profiles.

19. The one or more non-transitory computer readable media of claim 16, wherein validating the email template comprises:

checking color contrast ratios between text and background elements using an accessibility checker agent.

20. The one or more non-transitory computer readable media of claim 16, wherein validating the email template comprises:

calculating readability scores using linguistic metrics including Flesch-Kincaid grade level measurements.

* * * * *